(12) United States Patent
Sandrin et al.

(10) Patent No.: US 12,533,110 B2
(45) Date of Patent: Jan. 27, 2026

(54) ELASTOGRAPHY DEVICE AND METHOD

(71) Applicant: ECHOSENS, Paris (FR)

(72) Inventors: Laurent Sandrin, Bourg-la-Reine (FR); Stéphane Audiere, Paris (FR)

(73) Assignee: ECHOSENS, Paris (FR)

( * ) Notice: Subject to any disclaimer, the term of this patent is extended or adjusted under 35 U.S.C. 154(b) by 95 days.

(21) Appl. No.: 18/152,516

(22) Filed: Jan. 10, 2023

(65) Prior Publication Data

US 2024/0225606 A1 Jul. 11, 2024

(51) Int. Cl.
*A61B 8/00* (2006.01)
*A61B 8/08* (2006.01)

(52) U.S. Cl.
CPC .............. *A61B 8/485* (2013.01); *A61B 8/08* (2013.01); *A61B 8/085* (2013.01); *A61B 8/4483* (2013.01)

(58) Field of Classification Search
CPC ........... A61B 8/485; A61B 8/08; A61B 8/085; A61B 8/4483; A61B 8/5207; A61B 8/5223

See application file for complete search history.

(56) References Cited

U.S. PATENT DOCUMENTS

| 5,902,240 | A * | 5/1999 | Ishii | G01N 29/38 |
| | | | | 600/438 |
| 10,278,671 | B2 * | 5/2019 | Fan | A61B 8/5269 |
| 10,582,911 | B2 * | 3/2020 | Labyed | A61B 8/485 |
| 11,253,223 | B2 * | 2/2022 | Souzy | A61B 5/113 |
| 2004/0249259 | A1 * | 12/2004 | Heimdal | G01S 7/52087 |
| | | | | 600/407 |
| 2004/0249281 | A1 * | 12/2004 | Olstad | G01S 7/52042 |
| | | | | 600/437 |
| 2005/0119568 | A1 * | 6/2005 | Salcudean | G01S 15/8977 |
| | | | | 600/437 |
| 2005/0177044 | A1 * | 8/2005 | Rubin | A61B 6/488 |
| | | | | 600/437 |
| 2005/0215899 | A1 * | 9/2005 | Trahey | A61B 5/0048 |
| | | | | 600/439 |

(Continued)

FOREIGN PATENT DOCUMENTS

| CN | 112294365 A | * | 2/2021 | ............... A61B 8/54 |
| EP | 3381374 A1 | * | 10/2018 | ............... A61B 8/08 |

OTHER PUBLICATIONS

Couade et al. "In Vivo Quantitative Mapping of Myocardial Stiffening and Transmural Anisotropy During the Cardiac Cycle", Feb. 2011 (Year: 2011).*

(Continued)

*Primary Examiner* — Adil Partap S Virk
(74) *Attorney, Agent, or Firm* — Pillsbury Winthrop Shaw Pittman LLP

(57) ABSTRACT

An elastography device to obtain a signal representative of variations of a mechanical property of a region of a body of a subject with time, includes an electronic unit adapted to determine, at a repetition rate of at least 4 measurements per second and for a duration of at least 1 second, measurements of the mechanical property, each measurement being associated with a respective time, wherein the signal representative of the variations of the mechanical property with time includes a plurality of the measurements of the mechanical property determined.

20 Claims, 8 Drawing Sheets

(56) References Cited

U.S. PATENT DOCUMENTS

| | | | | |
|---|---|---|---|---|
| 2008/0249408 | A1* | 10/2008 | Palmeri | A61B 8/485 600/438 |
| 2008/0285819 | A1* | 11/2008 | Konofagou | A61B 8/485 382/128 |
| 2009/0056453 | A1* | 3/2009 | McAleavey | A61B 8/5207 73/597 |
| 2010/0138163 | A1* | 6/2010 | Gallippi | A61B 8/485 702/41 |
| 2011/0046488 | A1* | 2/2011 | Elle | A61B 8/12 600/453 |
| 2011/0054314 | A1* | 3/2011 | Tanigawa | G01S 7/52073 600/438 |
| 2012/0197118 | A1* | 8/2012 | Lisiecki | A61B 8/04 600/438 |
| 2013/0123630 | A1* | 5/2013 | Freiburger | A61B 8/485 600/443 |
| 2014/0094702 | A1* | 4/2014 | Kim | A61B 8/4281 600/438 |
| 2015/0320394 | A1* | 11/2015 | Arnal | A61B 8/485 600/438 |
| 2015/0327835 | A1* | 11/2015 | Kim | A61B 8/5223 600/438 |
| 2017/0079620 | A1* | 3/2017 | Xie | A61B 8/4477 |
| 2017/0224308 | A1* | 8/2017 | Labyed | A61B 8/08 |
| 2019/0192119 | A1* | 6/2019 | Salcudean | A61B 8/4227 |
| 2020/0008779 | A1* | 1/2020 | Göksel | G01S 15/8993 |
| 2020/0085407 | A1* | 3/2020 | Grundfest | A61B 8/085 |
| 2020/0178938 | A1* | 6/2020 | Alizad | A61B 8/5276 |
| 2020/0253587 | A1* | 8/2020 | Barannyk | A61B 8/5269 |
| 2021/0022709 | A1* | 1/2021 | Sandrin | G01S 7/52041 |
| 2021/0145411 | A1* | 5/2021 | Aladahalli | A61B 8/54 |
| 2021/0145608 | A1* | 5/2021 | Herr | A61B 8/0825 |
| 2023/0091955 | A1* | 3/2023 | Maltz | A61N 5/1067 600/407 |
| 2024/0225606 | A1* | 7/2024 | Sandrin | A61B 8/5223 |

OTHER PUBLICATIONS

Sandrin et al., "Fibroscan® in hepatology: a clinically-validated tool using vibration-controlled transient elastography", Sep. 20-23, 2009 (Year: 2009).*

Millonig et al., "Liver stiffness is directly influenced by central venous pressure", 2010 (Year: 2010).*

Terashi et al., "Usefulness of Liver Stiffness on Ultrasound Shear-Wave Elastography for the Evaluation of Central Venous Pressure in Children With Heart Diseases", 2019 (Year: 2019).*

Fatemi et al., "Imaging Elastic Properties of Biological Tissues by Low-Frequency Harmonic Vibration", 2003 (Year: 2003).*

Nandlall et al., "Monitoring and Staging Abdominal Aortic Aneurysm (AAA) Disease with Pulse Wave Imaging (PWI)", 2014 (Year: 2014).*

Andonian et al., "Shear-Wave Elastography Assessments of Quadriceps Stiffness Changes prior to, during and after Prolonged Exercise: a Longitudinal Study during an Extreme Mountain UltraMarathon", 2016 (Year: 2016).*

Wen et al., "Limbic system damage in MS: MRI assessment and correlations with clinical testing", 2017 (Year: 2017).*

CN112294365 Translation, 2021 (Year: 2021).*

Extended European Search Report as issued in European Patent Application No. 23305032.7, dated Jul. 5, 2023.

Couade, M., et al., "In Vivo Quantitative Mapping of Myocardial Stiffening and Transmural Anisotropy During the Cardiac Cycle," IEEE Transactions on Medical Imaging, IEEE, vol. 30, No. 2, Feb. 2011, XP011330306, pp. 295-305.

Sandrin, L., et al., "Fibroscan® in hepatology: a clinically-validated tool using vibration-controlled transient elastography," 2009 IEEE International Ultrasonics Symposium (IUS), Sep. 2009, XP031654564, pp. 1431-1434.

Byenfeldt, M., et al., "Influence of Probe Pressure on Ultrasound-Based Shear Wave Elastography of the Liver Using Comb-Push 2-D Technology," Ultrasound in Medicine and Biology, vol. 45, Issue 2, (Year: 2018), 411-428 (1-18).

Pierce, T. T., et al., "Variability of ultrasound-based methods to assess liver stiffness in NAFLD," The International Liver Congress, presented during the liver meeting of the European Association for the study of the Liver in 2022, (Year: 2022), 1 page.

Hsu, S. (MD), "Hemodynamics for the Heart Failure Clinician: a State-of-the-Art Review," Journal of Cardiac Failure, (Year: 2021), 15 pages.

Dhillon, J. K., et al., "Use of liver stiffness measurements in acute decompensated heart failure: new applications of a non-invasive technique," ECS Heart Failure, (Year: 2022), 8 pages.

Taniguchi, T. (MD), et al., "Liver Stiffness Reflecting Right-Sided Filling Pressure Can Predict Adverse Outcomes in Patients With Heart Failure," JACC: Cardiovascular Imaging, vol. 12, No. 6, © 2019 by the American College of Cardiology Foundation, (Year: 2019), pp. 955-964.

Taniguchi, T. (MD), et al., "Usefulness of Transient Elastography for Noninvasive and Reliable Estimation of Right-Sided Filling Pressure in Heart Failure," © 2014 Elsevier Inc., (Year: 2014), pp. 552-558.

Millonig, G., et al., "Liver stiffness is directly influenced by central venous pressure," Research Article, Journal of Hepatology, (Year: 2009), 5 pages.

* cited by examiner

ELASTOGRAPHY DEVICE AND METHOD

FIELD

The present invention relates to the field of elastography, for example liver elastography. More specifically, the invention relates to an elastography device and an elastography method to accurately determine the variation of liver stiffness of a subject over time.

BACKGROUND

Measuring liver stiffness (LS) has been shown to be a very useful tool to help health care professionals detect or characterize liver disease or damages, and more generally monitor the condition of the liver of a subject.

There are basically two kinds of elastography devices for liver stiffness measurement (LSM): imaging devices which derive the LSM from an image of stiffness using for example Shear Wave Elastography, SWE, (as detailed for example in "Influence of Probe Pressure on Ultrasound-Based Shear Wave Elastography of the Liver Using Comb-Push 2-D Technology", Byenfeldt, Marie et al. Ultrasound in Medicine and Biology, Volume 45, Issue 2, 411-428) and devices based on Vibration-Controlled Transient Elastography (hereinafter referred to as VCTE), such as the FibroScan® system.

With the FibroScan® system, an operator places the tip of a probe, that has a rather small diameter (typically comprised between 5 and 10 mm), in contact with the subject's body, in front of the expected area of a subject's liver. The operator then presses a button to make the probe's tip deliver to the subject a transient, low frequency mechanical pulse (the spectrum of this pulse is centered on a frequency comprised typically between 10 and 500 hertz). This pulse generates elastic waves that travel in the subject's body. An ultrasound transducer mounted on the probe's tip, in contact with the subject's body, then emits a number of ultrasound shots into the tissue, with a high repetition rate, of 6 kilohertz for instance. The echo signals, corresponding to the backscattering of the different ultrasound shots emitted, are acquired by the probe to track slight movements of the tissue caused by the elastic waves passing through. The tracking is performed using correlation techniques applied to successive echo signals. The detected movements enable one to compound an elastic wave propagation image showing the tissue deformation both as a function of depth z, and as a function of time t, sometimes referred to as an "elastogram" (also called "strain map" or "displacements" or "shear wave propagation map"). An example of an elastogram is represented in FIG. 1.

The mechanical pulse delivered by the probe's tip generates both a shear wave and of a compression wave. In other words, the elastic waves mentioned above combine a shear wave and a compression wave. These two waves have very different propagation speeds and, thanks to the transient nature of the mechanical excitation, they can be easily separated in time and identified in the elastic wave propagation image. For example, referring to FIG. 1, this figure shows an elastic wave propagation image 105. In FIG. 1, the compression wave is identified by the reference sign 105C, while the much slower shear wave is identified by the reference sign 105S. Also shown in FIG. 1, is a region of interest (ROI) which is bound by two dashed lines at 25 mm and 65 mm, which corresponds to the depth under the patient skin where liver is typically located. This elastic wave propagation image can thus be used to precisely determine the propagation speed of shear waves in the tissue to be characterized, from which the stiffness of this tissue can be derived. These stiffness results are then provided to the operator.

The VCTE-based elastography devices typically provide several measurements of Liver Stiffness (or other part of the body, the system not being limited to evaluation of liver condition) collected at different timepoints when the operator triggers measurements. From these several measurements, a unique value representative of the LSM is then provided as an average (mean or median) of the measurements collected in the image based on a Region Of Interest (ROI) positioning and/or at different timepoints.

In general, to obtain a reliable measurement of liver stiffness, the manufacturer recommends that a series of 10 measurements of liver stiffness be obtained as detailed above, and the final liver stiffness measurement is calculated from these measurements. For example, the final measurement corresponds to the mean or the median of the series of measurements. Each measurement of the series of measurements is therefore triggered by the operator (for example by pressing a button to generate a transient displacement) at respective times.

Even if this technology works well and provides very satisfying results, it is known that there is a variability in the measurements of the series of measurements which can be quite large. Such variability is mentioned, for example, in the poster "Variability of ultrasound-based methods to assess liver stiffness in NAFLD" by Theodore T. Pierce et al. presented during the liver meeting of the European Association for the study of the Liver in 2022. While this variability had until now been mainly attributed to the conditions for carrying out the measurements (position of the subject, inclination of the probe, liver movements, etc.) and to the subject's respiratory cycle, the inventors of the present invention investigated whether other factors could explain this variability, and how such factors might be considered in the evaluation of the liver stiffness of the subject.

SUMMARY

An aspect of the invention relates to an elastography device to obtain a signal representative of variations of a mechanical property of a region of a body of a subject with time. The elastography device may comprise an electronic unit adapted to determine, at a repetition rate of at least 4 measurements per second and for a duration of at least 1 second, measurements of the mechanical property, each measurement of the mechanical property being associated with a respective time, wherein the signal representative of the variations of the mechanical property with time comprises a plurality of the measurements of the mechanical property determined.

By "mechanical property", it is meant any physical property or parameter relating to the behavior of the region of the human body when subjected to one or more mechanical stresses. For example, the mechanical property may be conventional quantities such as stiffness, elasticity, Young's modulus, shear modulus, shear wave speed, viscoelasticity, viscosity, etc. . . . The mechanical property may also be any value derived from one or more of these physical properties or parameters.

In the following, particular reference is made to stiffness, but aspects of the invention apply to other mechanical properties. Also, particular reference is made to the liver as a region of the body, but aspects of the invention could apply to other regions of the body, such as the brain.

By "repetition rate", it is meant a number of measurements performed by unit of time. By "duration" it is meant a time interval during which the measurements are acquired.

As detailed below, the inventors have demonstrated that the stiffness of a region of a subject's liver was not, contrary to what one might think, a constant value, but, instead, it varies over time. In particular, it was found that the variations of the Central Venous Pressure over time can be found in the measurement of the stiffness of the liver. In other words, the stiffness of the liver is a function whose values vary over time, in particular during a cardiac cycle. Therefore, obtaining the elasticity signal (and its variations over short periods of time, of the order of a second for example) has a relevant medical value, and makes it possible to determine in a much more precise way certain indicators relating to stiffness (the median of the signal, for example).

Until now, to the inventors' knowledge, no one has thought of studying stiffness in this manner. The conventional methods of elastography are all based on the acquisition of point measurements of elasticity, the temporal spacing between point measurements being too large (generally greater than or equal to 1 second) so that it is not possible to visualize the variations of stiffness over short periods of time.

Unlike conventional elastography techniques, an aspect of the present invention proposes to acquire measurements with a sufficiently high repetition rate (at least 4 measurements per second) to be able to observe such variations. These measurements correspond to samples of the stiffness signal E(t) over time. Each measurement $E_k$ is thus associated with a respective time $t_k$, and the signal E(t) can be constructed from the measurements $E_k=E(t_k)$.

To increase the precision of the constructed signal, in an embodiment, the measurements are acquired at shorter times, i.e. at a higher repetition rate, for example at least 5 measurements per second (e.g. 5, 6, 7, 8, 9, 10 measurements per second) or more than 10 measurements per second. The higher the repetition rate, the more accurately the variations of the signal are captured, but the greater the computational resources are to be implemented.

The measurements are acquired over a duration of at least 1 second, which corresponds to the average duration of a cardiac cycle in a human being. Therefore, the variations of stiffness over a cardiac cycle may be observed in the obtained signal. It will be appreciated that durations greater than 1 second may be used.

It is noted that aspects of the present invention may be implemented as part of any elastography technique, as soon as the elastography device is configured to perform the measurements at sufficient repetition rate.

In particular, an aspect of the present invention may be implemented in the context of Transient Elastography techniques, including ARFI (Acoustic Radiation Force Impulse), SWE (Shear Wave Elastography) or VCTE (Vibration-Controlled Transient Elastography). Therefore, in one or several embodiments, the elastography device may comprise:

a probe that comprises: a protruding part to be applied against the body of the subject and at least one ultrasound transducer;

wherein, for determining each of the measurements of the mechanical property, the electronic unit may be adapted to:

deliver to the body of the subject, via the protruding part, a transient, low frequency mechanical pulse;

upon delivery of the mechanical pulse, control the ultrasound transducer to emit a sequence of ultrasound pulses, and acquire echo signals received in response by the ultrasound transducer to track how a low frequency elastic wave induced by the mechanical pulse propagates through the region of the body of the subject;

determine the respective measurement of the mechanical property related to low frequency elastic wave propagation.

In particular, the elastography device may be a VCTE device. In this case, the probe may further comprise a low frequency vibrator arranged to move the protruding part of the probe, and the delivery of the transient, low frequency mechanical pulse may comprise:

control, by the electronic unit, the low frequency vibrator to deliver to the body of the subject said transient, low frequency mechanical pulse.

By "transient pulse", it is meant a mechanical vibration that is temporary. The duration of the pulse, that is the active time, during which there is a substantial motion protruding part (induced by the vibrator in the case of a VCTE device) is followed by a downtime during which there is no or substantially no motion of the protruding part. By substantially no motion, it is meant for instance that, during this downtime, the displacement of the protruding part that may be induced by the vibrator remains smaller than $\frac{1}{10}$ or even $\frac{1}{20}$ of the peak displacement of protruding part. For the transient pulses mentioned above, an actuation ratio, equal to the pulse's active time, divided by the sum of this active time and the following down time, is typically below 50%, or even below 20%. The downtime is the duration between the end of the active time and a subsequent significant motion of the protruding part (corresponding for instance to a subsequent transient, mechanical pulse), should there be any.

By low frequency pulse, it is meant that the central frequency of the pulse is below 500 Hz, or even below 250 Hz. The central frequency of the pulse is, for instance, the average or the median frequency of the spectrum of the displacement or of the speed of displacement corresponding to that pulse, or the peak frequency of a main peak of this spectrum, or the mean of the −3 dB or −6 dB cutoff frequencies of the spectrum.

In one or more embodiments, when the elastography device is a VCTE device, a peak-to-peak amplitude of a displacement of the protruding part of the probe induced by the low frequency vibrator may be between 0.2 and 10 mm, for example between 0.5 and 2 mm.

In one or more embodiments, the elastography device the electronic unit may be configured to control a display device to display a curve representative of at least a portion of the obtained signal.

The medical practitioner may use this curve to analyze the mechanical property of the subject and to guide his diagnostic.

In one or more embodiments, the respective time associated with each measurement of the mechanical property corresponds to a time at which the measurement is determined.

Alternatively, when the measurement is obtained from an emission of a mechanical pulse, the respective time associated with the measurement may be a time at which the corresponding mechanical pulse is delivered. Other embodiments are possible.

In one or more embodiments, the duration of the determination of the measurements may be at least 3 seconds.

A duration of 3 seconds ensures, for almost all subjects, to capture the variations in mechanical property during at least two cardiac cycles (a cardiac cycle lasting, for the vast majority of the population, between 0.7 and 1.5 seconds). However, it will be appreciated that a longer duration may be used, for example 5 seconds, 10 seconds or more than 10 seconds.

In one or more embodiments, the region of the body may be a part of a liver of the subject, and a central frequency of the mechanical pulses (MP) induced in the region of the body may be between 10 Hz and 500 Hz.

Aspects of the invention are not limited to the characterization of the liver and may be extended to other parts of the body, for example the brain.

It is noted that the obtention of the signal E(t) may be a challenge from a computational point of view. Indeed, the obtention of the signal E(t) involves on-the-fly determination of a LSM value several times per second (e.g. at least 4 measurements per second), since a cardiac cycle typically lasts about 1 second, and therefore on-the-fly processing of each corresponding series of echoes. To perform such processing, the electronic unit may for instance comprise two processors:

a first, special purpose processor, such as an FPGA ("Field Programmable Gate Array"), for processing the echo signals acquired using a correlation technique, to determine tissue strain, or, more generally, a tissue motion parameter, (as a function of time and depth), and a second, general-purpose processor.

This architecture accelerates notably the processing of the echo signals, in particular because the (pre)processing achieved by the first processor reduces substantially (typically by a factor of 10, or even more) the quantity of data to be transmitted to the general-purpose processor, thus reducing the corresponding transmission time. And, in practice, this transmission time is often the most time limiting step of the overall processing of the echo signals.

Still, implementing the correlation technique in such a special purpose processor is challenging in itself. Indeed, the displacement of the probe's tip or head is desirably compensated before correlating the echo signals with each other, and the usual techniques to compensate for this displacement (based on strong echo detection, and Fourier-domain compensation) are very challenging to implement. To achieve such a displacement compensation, the ultrasound pulses emission and/or reception times may for instance be pre-compensated (upon emission and/or reception), depending on the probe's tip or head displacement.

Therefore, in one or more embodiments in which the elastography device comprises a low frequency vibrator, the electronic unit may be further configured to generate, for one or more of the ultrasound pulses emitted:

a temporal offset upon emission ($\delta t_{TX}$), by which the emission of an ultrasound pulse is shifted; and/or a temporal offset upon reception ($\delta t_{RX}$), by which an echo signal, acquired in response to said emitted ultrasound pulse, is shifted;

so as to compensate for a temporal shift of said echo signal with respect to other echo signals acquired, caused by a displacement of the ultrasound transducer occurring during said sequence of ultrasound pulses (USP);

the temporal offset upon emission ($\delta t_{RX}$) and/or the temporal offset upon reception ($\delta t_{RX}$) being adjusted so that a difference thereof is equal to $2 \cdot d/v_{us} + C$, where d is a displacement of the probe with respect to a reference position, $v_{us}$ is a speed of ultrasound in the region of the body, and C is a constant.

In one or more embodiments, the electronic unit may be further adapted to determine, from the obtained signal, at least one feature relating to the mechanical property.

For example, the at least one feature may be a function of a maximum, a minimum, a mean, a standard deviation and/or a percentile of the obtained signal.

As mentioned above and detailed below, the obtained signal E(t) takes into account the variations of the mechanical property over time, even during very short time intervals (of the order of a second). It is then possible to extract from this signal a feature (in particular a point feature) relating to the mechanical property, and this feature is generally more accurate than that obtained by conventional elastography techniques. For example, the median of the signal E(t) provides more accurate information than the median of 10 measurements taken at random, and reflects more faithfully the real mechanical behavior of the part of the body considered.

In addition, the electronic unit may be further adapted to control a display device to display the at least one feature relating to the mechanical property.

In one or more embodiments, the electronic unit may be further adapted to determine a breath holding indicator indicating whether the subject is holding his breath or not.

Indeed, as detailed hereinafter, when the subject is breathing, the stiffness signal is very noisy. On the other hand, when the subject is holding his breath, a large part of the noise disappears and the variations of the signal E(t) are more visible, in particular the variations linked to the cardiac cycle. The signals obtained are therefore not necessarily analyzed and used in the same way depending on whether they are obtained while the subject is breathing or holding his breath.

Also, it may be desirable to be able to automatically determine when the subject is breathing or not (which means in practice that the studied medium is unstable or stable), to, for example, trigger the measurements only when the subject holds his breath, or to determine and analyze a portion of the signal during which the patient holds his breath.

For example, the breath holding indicator may be determined by emitting successive ultrasound signals, receiving respective echo signals in response to the emission of said ultrasound signals, and computing a correlation coefficient between successive echo signals among the received echo signals received, and comparing the computed correlation coefficient to a predefined threshold.

The predefined threshold may be set to any value greater than 0.5, depending on the desired precision of the indicator. For example, the predefined value may be set to 0.8 or to a higher value, for example 0.9, 0.95 or 0.99.

The ultrasound signals emitted to determine the breath holding indicator may be different ultrasound signals that those of the sequences of ultrasound pulses used to track how the low frequency elastic waves induced by the mechanical pulses propagate through the region of the body of the subject.

In some embodiments, the electronic unit may be adapted to trigger the determination of the measurements when the breath holding indicator indicates that subject is holding his breath.

For example, when the elastography device comprises a low frequency vibrator, the electronic unit may be adapted to control the low frequency vibrator to trigger the delivery of the plurality of mechanical pulses when the breath holding indicator indicates that subject is holding his breath.

In one or more embodiments, the plurality of mechanical pulses may be automatically delivered. For example, the plurality of mechanical pulses may be automatically delivered upon determination, via the breath holding indicator, that the subject is holding his breath.

In one or more embodiments, a portion of the obtained signal may comprise measurements determined while the subject is holding his breath.

In such embodiments, the electronic unit may be further adapted to perform a spectral analysis of the portion of the obtained signal so as to obtain at least one spectral characteristic of said portion of the signal; and the electronic unit may be further adapted to determine at least one feature relating to the mechanical property, said at least one feature being a function of the at least one spectral characteristic obtained.

As detailed below, when the subject is holding his breath, the obtained signal presents periodic or pseudo-periodic variations whose characteristics can be extracted via spectral analysis, and these characteristics can be used to determine one or more features relating to the mechanical property.

As these periodic or pseudo-periodic variations are linked to the variations of the Central Venous Pressure, the spectral characteristics can also be used, alternatively or in addition, to determine one or more features relating to the Central Venous Pressure.

In one or more embodiments, said portion of the obtained signal may correspond to a first time interval, and the electronic unit may further be adapted to:
  receive an electrocardiogram of the subject, wherein a portion of the electrocardiogram corresponds to a second time interval, the first time interval and second time interval overlapping in time; and
  control a display device to display both a curve representative of the portion of the obtained signal and a curve representative of the portion of the electrocardiogram.

Indeed, since the variations of the obtained signal are linked to the variations of the Central Venous Pressure, and therefore to the heart's activity, it may be desirable for the medical practitioner to obtain both information.

In one or more embodiments, the electronic unit may be further adapted to determine, from the portion of the obtained signal, information relating to a variation of a central venous pressure of the subject with time.

Indeed, since the variations of the obtained signal are linked to the variations of the central venous pressure, information, such as point features or patterns of variation, may be extracted from the obtained signal.

For example, such information may comprise at least one indicator relative to a drift of the central venous pressure of the subject over time.

In some embodiments, the electronic unit may be further adapted to emit, based on the determined information, an alert relative to a possible cardiovascular pathology of the subject.

Another aspect of the invention relates to an elastography method, implemented by an elastography device to obtain a signal representative of variations of a mechanical property of a region of a body of a subject with time. The elastography method may comprise:
  determining, at a repetition rate of at least 4 measurements per second and for a duration of at least 1 second, measurements of the mechanical property, each measurement of the mechanical property being associated with a respective time;
  wherein the signal representative of the variations of the mechanical property with time comprises a plurality of the measurements of the mechanical property determined.

Other features and benefits of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION

It is known that liver pathologies can have repercussions on the spleen. For instance, liver cirrhosis leads to portal hypertension, which corresponds to a significant increase in pressure in the portal vein and which results in an increase in the Spleen Stiffness Measurement (SSM).

Likewise, since the blood circulates from the liver to the heart via the hepatic vein and the inferior cava vena, heart pathologies may have repercussions on the liver. For example, severe heart failure causes blood to flow back from the heart into the inferior vena cava. This congestion increases pressure in the inferior vena cava, and when this pressure is too high, the liver becomes engorged (congested) with blood, which results in an increase of the Liver Stiffness Measurement (LSM).

Figure 1:
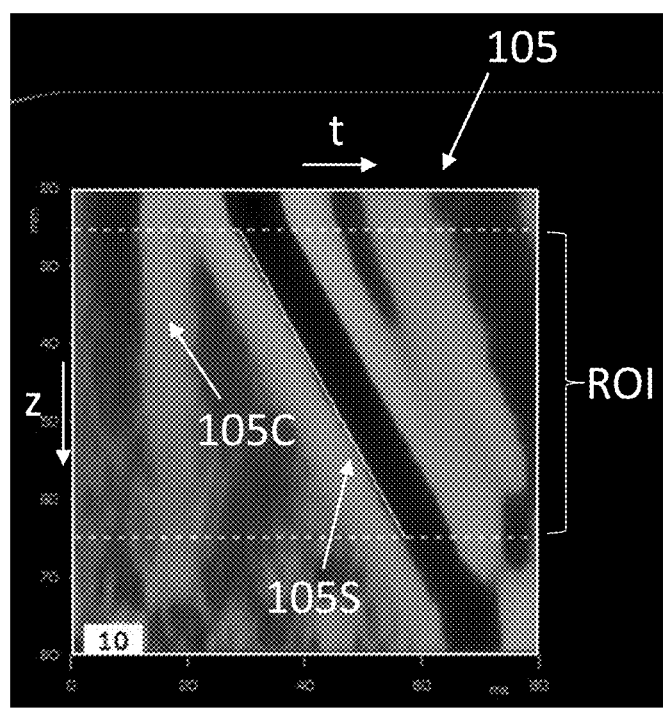
FIG. 1 represents an example of an elastogram.

In particular, the measurement of the Right Atrial Pressure (RAP), i.e. the measurement of the blood pressure in the right atrium of the heart, and the LSM are strongly correlated. The measurement of the Right Atrial Pressure (RAP) can be done using an invasive catheter. More specifically, the values of LSM have been measured by using a transient elastography device as in FIG. 1 for a set of patients with heart failure without structural liver diseases.

Measurements of RAP were also obtained for the same patients by using right-sided cardiac catheterization, which is the reference method for assessing RAP of a subject. A correlation exists between these two parameters ($p<0.0001$).

Moreover, RAP measurement of a subject fluctuates as a function of time during the cardiac cycle.

Figure 2:
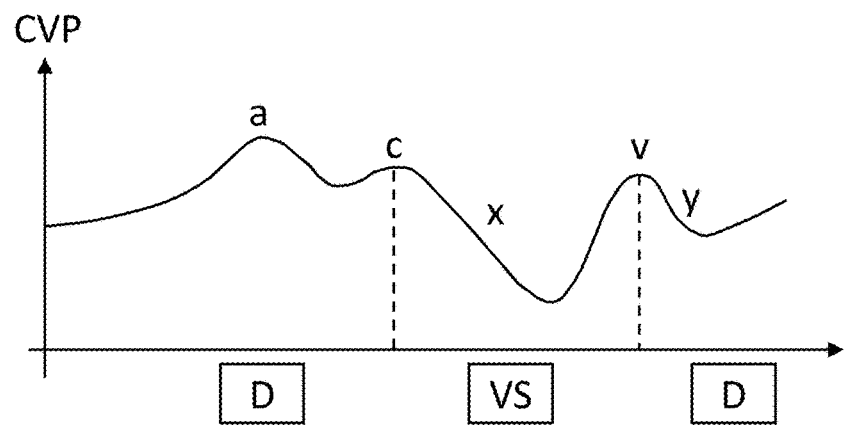
FIG. 2 represents a typical curve representative of variations of the Central Venous Pressure during a cardiac cycle.

More specifically, the curve representing variations of the Central Venous Pressure (CVP) of a subject, which is a measure of pressure in the vena cava of the subject, during a cardiac cycle is a waveform containing five components: three peaks (a, c, v) and two descents (x, y), each component corresponding to a specific moment of the cardiac cycle. An example of such CVP waveform is represented in FIG. 2. In FIG. 2, "D" means "Diastole" and "VS" means "Ventricular Systole". At the end of a diastole, a peak called "a-wave" corresponds to an increase in pressure due to atrial contraction. Shortly after a-wave, a second peak called "c-wave" and representing early ventricular systole is observed, and corresponds to an increase in pressure due to tricuspid valve elevation into the right atrium. Following the c-wave, a significant descent in the CVP waveform is observed and is called "x-descent". The x-descent corresponds to a drop in atrial pressure during ventricular systole induced by atrial relaxation. At the end of ventricular systole, after the x-descent, the CVP value rises to a new peak called "v-wave". This rise corresponds to the filling of the atrium. Finally, at the beginning of the next diastole, a new drop in atrial pressure, called "y-descent", is observed and is caused by an entry of the blood into the ventricle.

The variation of the RAP of a subject over multiple cardiac cycles can be measured and it is found that the five components (the three peaks and the two descents recalled above) observed in the CVP signal are also observed in the RAP signal.

The inventors of the present invention have devised that it is possible to observe variations of LSM due to the cardiac cycle and in particular to observe the components of the CVP waveform directly in the LSM.

This finding is far from trivial. Indeed, it was previously believed that there is a correlation between "static" measurements of RAP and "static" measurements of LSM. By "static" it is meant that each measurement is obtained at a respective specific time or is derived from measurements obtained at respective different times. Such static measurements therefore correspond to characteristic values (for example, isolated values or average values) of the RAP and LSM signals but does not reflect the variations of these signals over time, in particular during the cardiac cycle. In fact, the inventors have devised that variations of RAP and LSM signals exist over the cardiac cycle. The finding that LSM could vary as a function of time was not at all anticipated or suggested.

The inventors have determined the behavior of LSM during several cardiac cycles, from a plurality of measurements taken per cardiac cycle. Knowing that a cardiac cycle typically has a duration of the order of a second, the inventors therefore carried out, on the same subject, several LSM measurements per second and obtained a representation of the variation of the LSM over several heart cycles.

On the first experiments that they carried out, the inventors noticed that the measurements obtained were very noisy, and that it was not easy to interpret the resulting signal. The inventors ultimately carried out the series of measurements over several cardiac cycles (in practice, over several seconds), by asking the subjects to hold their breath during the measurements. The results thus obtained are shown in FIG. 3.

Figure 3:
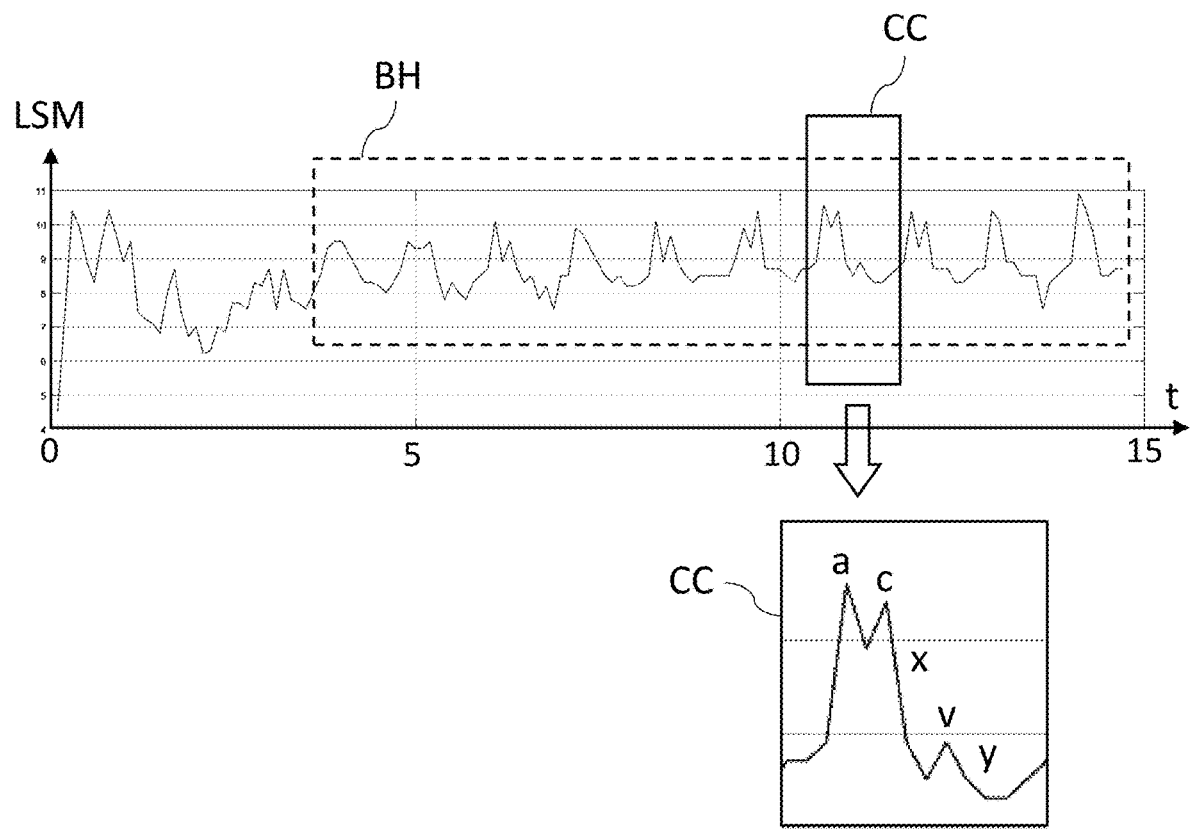
FIG. 3 represents an example of a curve representative of variations of the Liver Stiffness over time obtained from an elastography device according to an embodiment of the invention.

FIG. 3 depicts an experimental curve of variation of LSM (expressed in kPa) of a subject as a function of time t (expressed in seconds). To obtain this curve, LSM values of the subject were measured 10 times per second (i.e. at a repetition rate of 10 Hz, meaning 10 LSM per second) during 15 seconds. Between t=4 s and t=15 s (corresponding to the time interval denoted "BH" in the Figure), the subject was asked to hold his breath. As it can be seen from this Figure, before the subject holds his breath, the signal is very noisy. Once the subject has begun to hold his breath, the signal becomes less noisy, and after a few seconds (around t=8 s on FIG. 3) a pattern appears that recurs regularly. This pattern, as particularly noticed on the one noted "CC" in FIG. 5, has a duration of approximately 1 second and was found to have the same general shape as the CVP represented in FIG. 2. More specifically, pattern CC presents three peaks and two descents, which correspond to the a-, c- and v-waves and the x- and y-descents of the CVP.

To confirm their hypothesis, the inventors monitored, while measuring the LSM values of the subject, the subject's heart rate (using for example an electrocardiogram, ECG) and found that the patterns indeed coincided with the subject's different cardiac cycles.

In other words, the inventors discovered that it was possible to recover the CVP signal (or at least certain characteristics of the CVP signal) in the LSM signal.

This result was unexpected. Indeed, insofar as it was thought that a correlation between mean values of LSM and mean values of CVP might be expected, it was thought that such a correlation would, at best, only concern static values, as detailed above, and it was unexpected to observe a correlation between dynamic signals (i.e. to retrieve the characteristic temporal variations of the CVP signal in the LSM signal). This is because, the dynamic properties of liver stiffness are ignored. It was therefore unexpected that the mechanical response time of the liver was fast enough to mimic variations of cardiac signals. Furthermore, it was unexpected that variations due to the heart pump could travel backward to the liver and induce variations in LSM. To the inventor's knowledge, no publication has shown such an effect on liver stiffness. In addition, as it can be seen in FIG. 3 the LSM signal is very noisy and precautions should be taken to observe the variations of the CVP in the LSM signal (before the subject holds his breath, the characteristic variations of the CVP signal are drowned in noise and are not found in the LSM signal).

In addition, in order to determine LSM measurements at high repetition rate (e.g. at least 4 measurements per second), the device for acquiring the LSM may be adapted to be able to process the signals at the desired repetition frequency (several measurements per second).

From the experimentations carried out, it appears that the influence of the cardiac cycle on LSM variability is high and that implications of the cardiac cycle on LSM are numerous.

Contrary to what one might think, LSM is not constant over time even when the patient is stable and is holding his breath. Indeed, even when the patient is stable and is holding his breath, the variations in the LSM can reach up to 3 kPa. Three kPa is a significant variation considering that a patient is considered low-risk when LSM<8 kPa, intermediate risk when 8 kPa≤ LSM<12 kPa and high-risk when LSM≥12 kPa (see European Association for the Study of the Liver. EASL Clinical Practice Guidelines on non-invasive tests for evaluation of liver disease severity and prognosis—2021 update. J Hepatol, vol. 75, no 3, p. 659-689). Therefore, as will be appreciated by the skilled artisan, a 3 kPa can easily and significantly distort the LSM results and diagnosis and indicated a significant change in the patient risk stratification.

As a result, the patient may be asked to perform additional examinations which are not in fact necessary. As an example, the patient could be referred for a confirmatory test such as a liver biopsy which is invasive and painful. Thus, the fact of determining discrete measurements (e.g. triggered by an operator) and of extracting a single indicator of the liver stiffness from these measurements does not make it possible to fully take the intrinsic variability of LSM into account, and necessarily induces a loss of information that may have a strong preventive or diagnostic value. Consequently, to have precise information concerning the state of the liver, it is desirable to change paradigm compared to what has been done until now, and to study the variations of elasticity of the liver as a function of time. In other words, there is a need for a change in paradigm to consider LSM not as static measurements, as it is the case in the devices of the prior art, but rather as a signal varying over time.

Once the elasticity signal as a function of time is obtained, in an embodiment, one or more indicators are extracted therefrom, for example a mean, a percentile, an extremum, a function or combination of these indicators, etc. It is however noted that this information obtained directly from the LS signal remains more precise than information that would be obtained from consecutive elastograms, for example by taking an average of the elastograms to obtain a single LSM value.

Indeed, the variations due to the CVP (or equivalently to blood pressure) superimpose to the variations associated with the movement of the liver in front of the probe during breathing. In the liver, the shear wave frequency that is used to probe liver stiffness is typically equal to 50 Hz, which corresponds to a transient vibration of about 20 ms. Consecutive measurements of liver stiffness require that the time interval between consecutive mechanical pulses be at least a few periods for the shear waves not to superimpose. For a 50 Hz center frequency shear wave, given that the shear wave speed can be as slow as 1 m/s and is typically tracked until 80 mm depth, the propagation takes up to 80 ms to which the shear wave period of typically 20 ms (for transient vibration) should be added to reach 100 ms. This implies that the repetition rate can hardly exceed 1 pulse every 100 ms. With such repetition rate, it is not possible to neglect the cardiac cycle which period is typically of the order of a second. Since the maximum repetition rate of mechanical pulses is not fast enough to neglect the variations due to the cardiac cycles, averaging consecutive elastograms before computing liver stiffness would not result in a better estimate of liver stiffness, even if the subject holds his breath.

As mentioned above, an aspect of the instant technology relates to an elastography device configured to determine, at a high repetition rate (e.g. at least 4 measurements per second), measurements of a mechanical property of a region of a body of a subject, in order to obtain a signal representative of the variations of this mechanical property with time. This signal is captured for a duration of at least 1 second, and in an embodiment a duration of several seconds (for example, 3 to 10 seconds), to be able to capture variations of the mechanical property over several cardiac cycles (1 cardiac cycle typically lasting between 0.7 second and 1.5 seconds).

The mechanical property may be, in an embodiment, tissue stiffness and the region of the body may be a region of the liver, but the invention is not limited to this embodiment. For example, an aspect of the present invention can be applied to determination of the spleen stiffness or the brain stiffness. As a matter of fact, the brain is a large and soft tissue. Similarly to the liver, the blood flows through the brain, in this case into the superior (and not inferior like in the case of the liver) cava vein before entering the heart. Therefore, it is very likely that the brain stiffness be a surrogate of central venous pressure and right atrium pressure.

Figure 4:
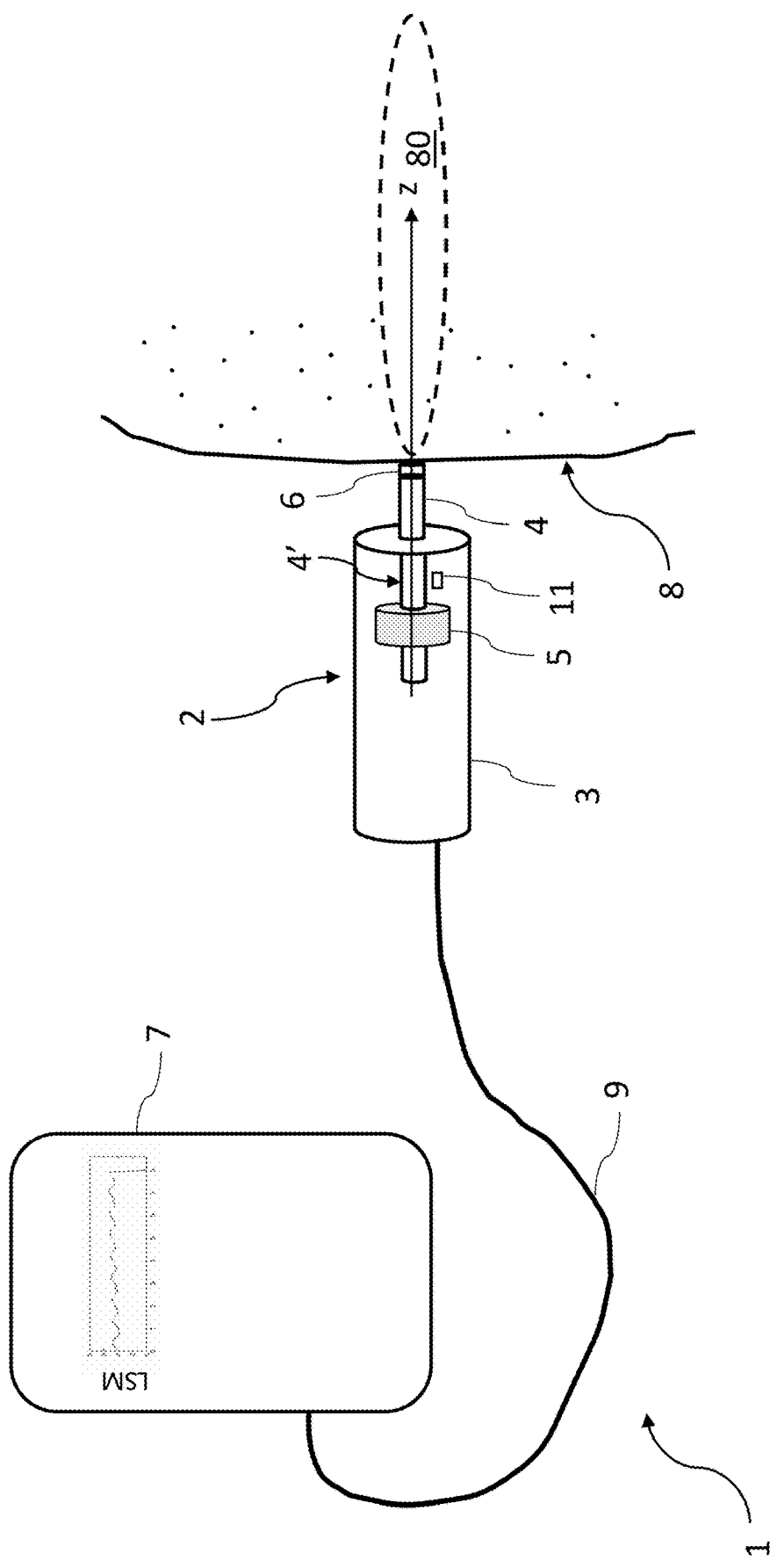
FIG. 4 schematically represents an elastography device according to an embodiment of the invention.

The measurements of the mechanical property can be obtained with a Vibration-Controlled-Transient-Elastography (VCTE) device 1 represented in FIG. 4.

Even if an aspect of the invention is described for VCTE-based elastography devices, it is noted that the present invention can apply to other elastography techniques, including elastography techniques in which shear wave can be generated by other means. For example, the invention is compatible with shear wave generation using acoustic radiation force. Acoustic radiation force is a technique in which the shear wave is generated using long burst (several tens of microseconds) of ultrasound signals. It does not require the use of a vibrator located in the probe.

The elastography device 1 of FIG. 4 comprises a probe 2 including a probe casing 3 (which forms the main body of the probe), to be handheld, and a protruding part, which protrudes from the casing 3. The protruding part can thus be applied against the body 8 of the subject, to deliver mechanical pulses to it, and to transmit and acquire U/S shots. In this embodiment, the protruding part is a tip 4, for instance a cylindrical tip (with a circular transducer 6 at its end).

Still, in other embodiments, the protruding part could be an ultrasound head (located at an end of the probe) including an array, for instance a linear array of U/S transducers. In this regard, it may be noted that the proposed technique can be used with a single element ultrasound transducer (like in the case of FIG. 4, which can be of various shapes: rectangular or ellipsoidal or circular for example), or with a multi-element ultrasound transducer (like an array of U/S transducers, for example a linear or convex or phased array ultrasound probe). While a single element ultrasound transducer is adapted to display A-mode and M-mode ultrasound imaging, a multi element ultrasound transducer can also display a B-mode image allowing an easier localization of the to-be-measured tissue. In the case of a multi element ultrasound transducer, at least one of the beamformed ultrasound lines is used to track how the mechanical pulses propagate. To this end, using the center beamformed ultrasound line (which is aligned with the probe axis) is beneficial, for symmetry considerations.

The probe 2 comprises also a low frequency vibrator 5, and the U/S (ultrasound) transducer 6, which is fixed at an end of a tip 4. Here, the U/S transducer 6, plays both the role of an ultrasound emitter and the role of an ultrasound receiver (alternatively). Still, in other embodiments, the probe may comprise an U/S emitter and an U/S receiver distinct from each other. Here, the U/S transducer 6 is arranged on the axis z of the vibrator. Still, in other embodiments, the U/S transducer could be located elsewhere on the probe, not necessarily on the vibrator's axis.

The tip 4 is actuated by the low frequency vibrator 5. Here, the vibrator 5 is arranged to move the tip 4 relative to the probe casing 3. The vibrator 5 is arranged to move a shaft 4', the end of which forming the tip 4 of the probe. Still, in other embodiments, the tip, or, more generally, the protruding part of the probe, could be bound to the probe casing with no motion with respect to the probe casing, the vibrator being then arranged to move a mass, inside the casing, to make the whole probe moving towards the tissue and back (by virtue of a recoil effect).

The vibrator 5 is a low frequency vibrator in that it moves the tip with a central, average frequency smaller than 500 hertz, or even smaller than 100 hertz (in contrast with ultrasound shots or echo signals, whose central frequency is typically higher than 1 megahertz, for instance between 1 and 5 megahertz). The vibrator is a low-frequency electromechanical actuator, for instance with one or several coils and magnets, similar to a loud-speaker actuator.

In this device 1, the vibrator 5 is rotationally symmetrical around a vibrator axis, which coincide with the probe axis z. When the vibrator 5 vibrates, it induces displacements that are mainly longitudinal, parallel to its axis. The shaft 4' is centered onto the axis z, and the vibrator 5 is arranged to move this shaft along the axis z.

In practice, the displacement of the ultrasound transducer 6, induced by the vibrator 5, has a peak-to-peak amplitude between 0.2 mm and 10 mm, and, in an embodiment, between 0.5 and 2 mm.

The probe 2 comprises a displacement sensor 11, arranged to output a measurement signal Sd representative of the displacement of the ultrasound transducer 6. In this embodiment, the measurement signal Sd is representative of the displacement of the ultrasound transducer 6 relative to the probe casing 3. A part of the displacement sensor 11 is fixed on the shaft mentioned above while another part of the sensor is fitted in the probe, with no motion with respect to the casing 3. The displacement sensor 11 may be a Hall-effect sensor, an induction displacement sensor, or any other suitable sensor.

Figure 5:
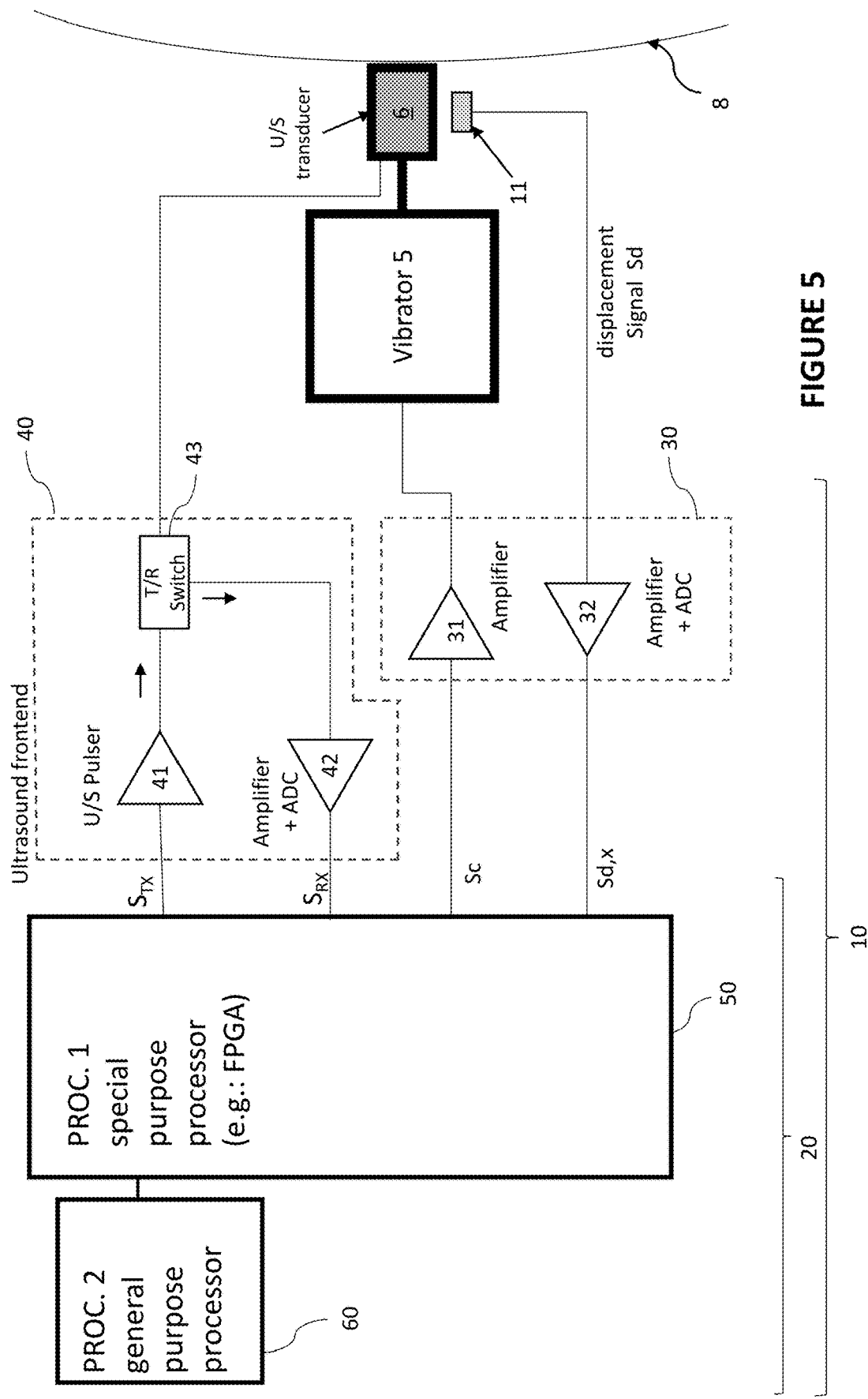
FIG. 5 schematically represents some elements of an electronic unit of the elastography device of FIG. 4 according to one or more embodiments of the invention.

The device 1 comprises also an electronic unit 10, connected to the vibrator 5 and to the U/S transducer 6. A block diagram of a possible embodiment of the electronic unit 10 is represented in FIG. 5. The electronic unit 10 of FIG. 5 comprises a control and processing module 20, an ultrasound front end 40, and a motion controller 30 to control the vibrator 5. The electronic unit 10 may be a computer connected to the vibrator 5 and to the U/S transducer 6.

The ultrasound front end 40 and the motion controller 30 are both connected to the control and processing module 20 (that is to say that they can receive instructions or control signals from the control and processing module 20 or send data or measurement signals to it). The electronic unit comprises also a signal conditioning module 32, to condition and digitalize the measurement signal Sd outputted by the displacement sensor 11. This signal conditioning module 32 is part of the motion controller 30, here.

The motion controller 30 comprises also an amplifier 31, to drive the vibrator 5. The amplifier 31 is configured to convert a control signal Sc into a form suitable to drive the vibrator, from an electrical point of view. The amplifier 31 may thus be a current amplifier or a power amplifier (such as the LM3886 power amplifier by texas instrument, for instance), for instance.

The ultrasound front end 40 comprises an ultrasound (U/S) pulser 41, an U/S receiver module 42 and a switch 43 for alternatively transmitting and receiving ultrasonic signals. The U/S pulser 41 comprises an electric circuit configured to generate an electric ultrasonic signal appropriate to drive the U/S transducer 6, based on a transmission control signal $S_{TX}$ outputted by the control and processing module 20. The U/S receiver module 42 comprises an electric circuit configured to acquire an electric ultrasonic signal (an echo signal), previously received by the U/S transducer 6 (and transmitted to the U/S receiver module 42 via the switch 43), and to transmit the corresponding (digitalized) U/S reception signal $S_{RX}$ to the control and processing module 20. The electric circuit of the ultrasonic receiver module 42 may comprise a voltage amplifier, one or more filters and an analog to digital converter (ADC), for instance an 8 to 16 bits ADC with a 10 to 100 Mega-sample per second rate.

The control and processing module 20 is a device or system comprising electric circuitry for processing data, such as a microprocessor coupled to a non-volatile non-transitory memory comprising machine executable instructions and/or a programmable microcircuit like an FPGA or another programmable circuit. The control and processing module 20 may also comprise one or several RAM memories or registers. Anyhow, the control and processing module 20 comprises at least one, here two processors 50, 60 and at least one memory.

Figure 6:
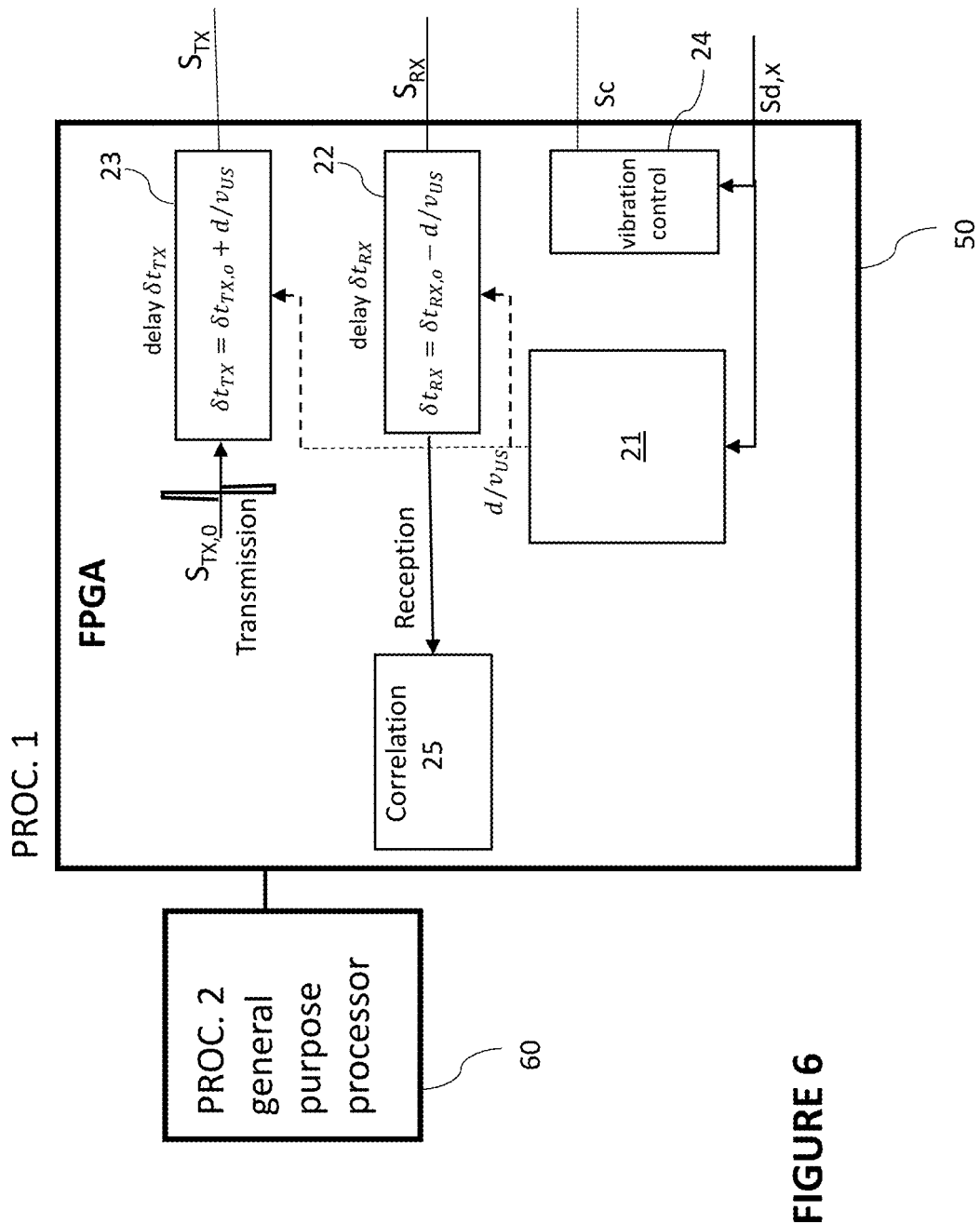
FIG. 6 schematically represents in more detail a control and processing module of the electronic unit of the elastography device of FIG. 4 according to one or more embodiments of the invention.

Some sub-modules of the control and processing module 20, that are implementing a technique of pre-compensation of the transducer's displacement, are represented in more details in FIG. 6. In an embodiment, this pre-compensation is typically performed in a programmable microcircuit like an FPGA so that the pre-compensation is performed on-the-fly.

Some of the elements of this electronic unit or circuit 10 (such as the signal conditioning module 32, for instance) can be housed in the probe 2 while other elements of this unit 10 (like the general-purpose processor 60) may be remote. Alternatively, the entire electronic unit 10 could be housed in the probe 2, or, on the contrary, it could be entirely located outside the probe. The electronic circuit includes various electronic components to carry out its functions.

The probe 2 is operatively connected to a central unit 7, which has the structure of a computer (and that could be a laptop, a smartphone, or a dedicated electronic device arranged to control and to interface the probe, and to process the signals acquired). The central unit comprises at least a memory and a processor. Here, it comprises also a user interface, such as a touch screen. The central unit 7 may also comprise a display for displaying some pieces of information, such as the curve representing the signal representative of the variations of the mechanical property of the region 80 over time during an examination of the subject. The display may also be used for displaying other pieces of information, for example an elastogram.

The probe may be connected to the central unit 7 by a connection cable 9, or by a wireless link. Here, some elements of the electronic unit 10 (in particular the general-purpose processor 60) are part of the central unit 7.

The electronic unit 10 (more specifically, its control and processing module 20, here) is configured (for instance, programmed via instruction stored in a memory) to control the electronic device 1 so that it operates to perform a series of measurements of the mechanical property of the region 80 of the body in order to obtain a signal representative of the variations of the mechanical property over time, for a time interval of at least one second, and preferably several seconds.

In one or more embodiments, the series of measurements of the mechanical property may be performed in response to a manual triggering by the operator. This manual triggering may be achieved by actuating a push-button switch arranged on the probe casing 3, or by actuating a foot-switch, for instance. In such a case, when the operator determined, based on one or more pieces of information, that the acquisition of the series of measurements can begin, he triggers acquisition of the measurements. Several measurements of the mechanical property of the probed region, related to low frequency elastic wave propagation (for instance its Young modulus) are then obtained, each measurement $E_n$ being associated with a respective time $t_n$, n being an integer greater than 1 (for example, n may be comprised between 10 and 1000). The signal $s_E(t)$ representative of the variations of the mechanical property over time may then be obtained from samples $E_n=s_E(t_n)$. The one or more pieces of information on the basis of which the operator determines that he can trigger the acquisition of the series of measurements may include, for example, information that the position and direction of the probe 2 is adequate (as detailed for instance in the not-yet published US patent application U.S. Ser. No. 17/695,053 assigned to the applicant) and/or information that the tip 4 is applied against the body 8 of the subject (for example, based on contact force level measured by a force sensor—like a strain gauge—or deduced from the position of the shaft 4' pushed into the casing when the tip is pressed on the subject's body) and/or information that the subject is holding his breath (as detailed later in the description).

It is noted that, in these embodiments, it is indeed the emission of the first mechanical pulse associated with the series of measurements which is triggered manually by the operator. The following mechanical pulses are delivered automatically at a predefined repetition rate of at least 4 pulses per second, and for a predefined duration of at least 1 second, and in an embodiment several seconds (for example, between 3 and 10 seconds).

In alternative embodiments, even the first mechanical pulse associated with the series of measurements is automatically emitted, based on one or more pieces of information. For example, the electronic unit 10 may be configured to determine whether one or more conditions are satisfied and to trigger the emission of the series of mechanical pulses when all necessary conditions are satisfied. For example, the electronic unit 10 may be configured to determine whether the position and direction of the probe 2 are adequate and/or whether the tip 4 is applied against the body 8 of the subject and/or whether the subject is holding his breath, and if these conditions are met, the electronic unit 10 may trigger the emission of the series of mechanical pulses.

In these embodiments, the determination, by the electronic unit 10, of whether the one or more conditions are satisfied may be performed in response to a manual triggering by the operator, achieved for instance by the touch screen of the central unit 7.

Figure 7:
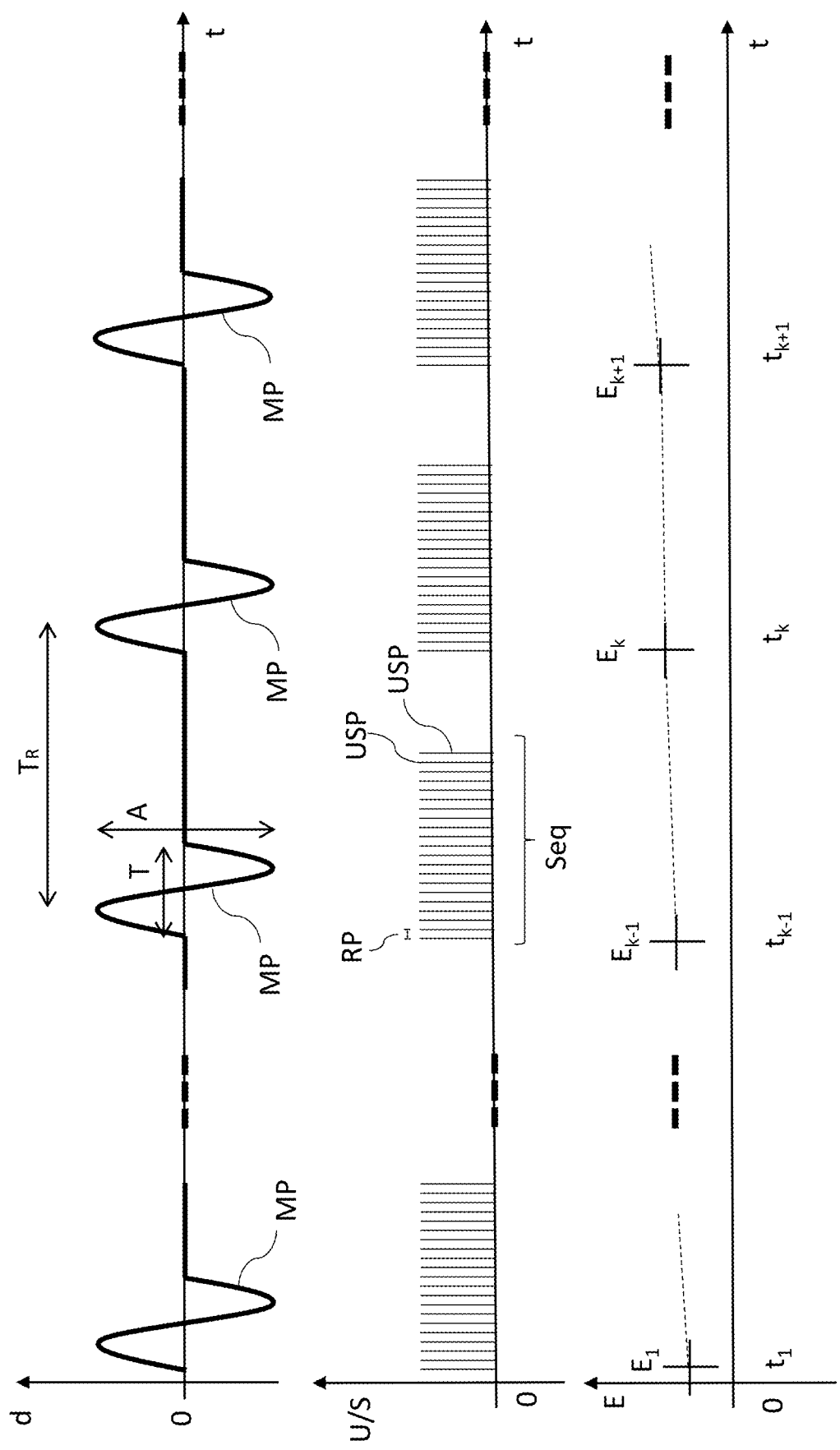
FIG. 7 represents a sequence of mechanical and ultrasound pulses emitted by the elastography device of FIG. 4 according to one or more embodiments of the invention.

As represented in FIG. 7, to obtain the series of measurements of the mechanical property, the electronic unit 10 may be configured to control the low frequency vibrator 5 to deliver to the body 8 of the subject, successively and repeatedly, a plurality of pulses MP (referred to as "mechanical pulses"), each pulse MP being a transient, low frequency mechanical pulse. Each mechanical pulse MP corresponds to a transient displacement d of the shaft 4' along the axis z directed towards the subject's body (see FIG. 4).

The control module 20 may be configured (for instance, programmed via machine executable instructions stored in a memory) to control the motion controller 30 in order to displace the shaft 4'. For example, the shaft 4' displacement d may be controlled according to a predetermined command signal. In particular, the displacement d may be controlled by a control-loop comprising the amplifier 31, the displacement sensor 11, the signal conditioning module 32, and a vibration control module 24 (FIG. 6), such as a PID (proportional, integral, derivative) corrector (still, in alternative embodiments, the vibrator may be controlled by an open loop—that is with no sensor feedback). The displacement d of the shaft 4' induced by the vibrator is a transient displacement, corresponding for instance to one period of a sinusoid having a duration T between 5 ms and 50 ms.

The mechanical pulses MP are typically delivered with a predefined repetition rate of at least 4 pulses per second, for instance a repetition rate of 5 or even 10 pulses per second or more. So, the mechanical pulses MP are repeated with a repetition period $T_R$ which is quite short, typically below 0.25 second. It will be appreciated that the shorter the repetition period $T_R$, the closer the measurements of the mechanical property can be made, and the more accurate the temporal signal constructed from these measurements, which makes it possible to properly monitor the variations of the value of the mechanical property over time. On the other hand, the shorter the repetition period $T_R$, the greater the computational resources required to process the data received, which may require specific arrangements of the elastography device described previously (as will be described later).

The displacement d of the shaft 4', induced by the vibrator 5, has a peak-to-peak amplitude A between 0.2 mm and 10 mm, and in an embodiment between 0.5 and 2 mm.

The central frequency of each mechanical pulse MP may be between 10 Hz and 500 Hz, for example between 50 Hz and 200 Hz when the elastography device is configured to characterize the liver of patients (typically 50 Hz).

As represented in FIG. 7, for each mechanical pulse MP, the electronic unit 10 controls the U/S (ultrasound) transducer 6 (with the U/S pulser 41 of the U/S front end 40, among others) so that the U/S transducer 6 emits a sequence Seq of ultrasound pulses USP, and acquires echo signals received in response by the U/S transducer 6, to track how the mechanical pulse MP propagates through the probed region 80 of the body 8 of the subject, located in front of the tip 4 of the probe.

For this sequence Seq, the central frequency of each ultrasound pulse USP is comprised for instance between 0.5 and 10 megahertz. The ultrasound pulses of the sequence Seq may be transmitted one at a time, two successive pulses being separated by a pulse repetition period RP, this pulse repetition period being typically between 0.1 millisecond and 2 milliseconds (which corresponds to a pulse repetition frequency between 0.5 kilohertz and 10 kilohertz), and in an embodiment between 0.3 ms and 1 ms. The ultrasound pulses USP of the sequence Seq mentioned above may also be transmitted by groups, for instance by groups of two pulses (to compute correlations between the two corresponding echo signals). The two pulses of each group may be separated by duration between 50 and 200 microseconds, while the groups of pulses themselves are separated by a longer duration, for instance higher than 0.2 or 0.5 ms. It will be appreciated that other transmission sequences can also be considered in various embodiments. Regarding the total duration of the sequence of U/S pulses Seq, it may be between 25 ms and 200 ms. This duration may be selected depending on the shear wave frequency and depending on the speed of propagation of the elastic wave which is the slower and depending on the depth of the region to be observed. For instance, for a shear wave frequency of 50 Hz, an 80 mm depth and a speed of propagation of 1 m/s (typical for shear waves in the liver of a subject), the sequence may have a duration of 100 ms.

Regarding the echo signals, acquired to track the propagation of the mechanical pulse considered, each of them is formed by a signal, received over time t by the U/S transducer 6 after the emission of one of the U/S pulses USP. It is more precisely the signal received within a given temporal window starting after this emission and having a given duration.

It is noted that other U/S sequences may be emitted independently from the U/S sequences Seq and inserted in the chronogram for other applications and uses. For example, other U/S sequences may be emitted for determining a breath holding indicator, indicating that the subject is holding his breath.

In the embodiments described herein, for each mechanical pulse MP, the electronic unit 10 determines tissue strain data, representative of tissue strain within the region 80, as a function of time t and as a function of depth z within the region 80. The tissue strain data is determined from the echo signals acquired to track how the mechanical pulse MP propagates through the region 80. As mentioned above, when represented graphically, as a function of time and depth (like in FIG. 1), such tissue strain data forms an elastogram, from which a measurement of the mechanical property (e.g. the tissue stiffness) may be determined.

The tissue strain data is determined, from the echo signals, using a correlation technique or another patterning matching algorithm, to determine how portions of the tissue move under the influence of the elastic wave that is passing through it (the elastic wave being generated by the periodic mechanical vibration delivered by the system). For instance, for each couple of two successively received echo signals, the two echo signals are correlated with each other, by the correlation module 25 (see FIG. 6), which enables one to determine tissue displacement (namely, the tissue displacement that occurred between the two U/S pulses), as a function of depth, and at given time.

As mentioned above, for each mechanical pulse MP, or at least for several of them, respective tissue strain data may be obtained and a respective measurement ($E_1$, $E_{k-1}$, $E_k$, $E_{k+1}$ in FIG. 7) of the mechanical property of the region 80 may be determined. Each determined measurement $E_n$ may be associated with a respective time $t_n$ which represents the instant at which the measurement is performed. For example, as in the embodiment represented in FIG. 7, each measurement $E_n$ is associated with a respective time $t_n$ equal to the time at which the corresponding mechanical pulse MP has been emitted. Other embodiments are possible. For example, each measurement $E_n$ may be associated with a respective time $t_n$ equal to the time at which the last of the echo signals is acquired in response to the emission of the corresponding sequence Seq of U/S pulses USP. Alternatively, each measurement $E_n$ may be associated with a respective time $t_n$ equal to the time at which the measurement $E_n$ is determined (i.e. after the determination of the corresponding tissue strain data). It is noted that the values of the times $t_n$ obtained by all these embodiments differ very little from each other, and that this difference has little impact on the interpretation of the signal E(t) obtained.

All the determined measurements $E_1$, $E_{k-1}$, $E_k$, $E_{k+1}$ correspond to discrete samples of a signal E(t) representative of the variations of the value of the mechanical property of the region 80 over time. The signal E(t) may then be reconstructed from samples $E_1$, $E_{k-1}$, $E_k$, $E_{k+1}$, for example by using linear interpolation (see the curve in dashed line of FIG. 7) or spline interpolation.

The mechanical property of the tissue, related to low frequency shear wave propagation may be a quantity related to the tissue stiffness, such as the propagation speed of shear waves $V_s$, the shear modulus of the tissue or the Young's modulus E of the tissue (which can be derived from the slope of the stripes identified in the elastogram, or from the variation of the time of flight of the measurement pulse as a function of depth). It may also be a quantity related to low frequency shear wave attenuation in the tissue, like viscosity.

The optional pre-compensation technique mentioned above (with reference to FIG. 5) is presented now, with reference to FIG. 6. It is noted that this pre-compensation technique is not mandatory. However, it makes it possible to accelerate the processing of the data, and therefore facilitates the acquisition of measurements of the mechanical property very close together in time (for example 4 to 10 measurements per second).

When processing the ultrasound echo signals acquired, in order to determine tissue strain, it is desirable to compensate for the tip's displacement d. Indeed, as the ultrasound pulses sent to probe the medium displacement are emitted by the tip end, the tip displacement, which is quite significant, adds up to the to-be measured tissue displacement. To reduce the correlation computation time, and to increase the signal-to-noise ratio, it is thus desirable to compensate for this displacement. Known compensation techniques are based on a post-processing of the echo signals, in which strong echoes are identified and employed to realign temporally these signals. But such a technique is time-consuming, and not well suited to be implemented in a special purpose processor like processor 60 (which may be an FPGA, for instance). So, in order to compensate for this displacement d, the electronic unit 10 (more specifically, its processor 60) is configured here to implement the following pre-compensation technique.

The ultrasound pulses emitted to track the mechanical pulses MP may be configured with:
  a temporal offset upon emission $\delta t_{TX}$, by which the emission of an ultrasound pulse is shifted; and/or
  a temporal offset upon reception $\delta t_{RX}$, by which an echo signal, acquired in response to said emitted ultrasound pulse, is shifted,
so as to compensate for a temporal shift of the echo signal with respect to other echo signals acquired, caused by the displacement d of the ultrasound transducer 6 (or plurality of ultrasound transducers), the temporal offset upon emission $\delta t_{TX}$ and/or the temporal offset upon reception $\delta t_{RX}$ being adjusted so that a difference thereof is equal to $\Delta t_0 - 2 \cdot d/v_{us}$, $\Delta t_0$ being a constant delay and $v_{us}$ being the speed of ultrasound in the tissue under examination.

The transducer's displacement is thus compensated from the beginning, without requiring a special post-processing.

In the case of FIG. 6, the elastography device is more specifically configured so that the temporal offset upon emission is equal to $\delta t_{TX,0} + d/v_{us}$, $\delta t_{TX,0}$ being a constant delay upon emission, while the temporal offset upon reception is equal to $\delta t_{RX,0} - d/v_{us}$, $\delta t_{RX,0}$ being a constant delay upon reception.

To introduce this delay upon emission, the control module 20 may generate a reference transmission control signal $S_{TX,0}$ (based on a predetermined transmission sequence stored in a memory of the control module, for instance), when a mechanical pulse is to be tracked, this signal being then delayed in a controlled manner, using a controllable delay 23, to produce the transmission control signal $S_{TX}$ sent to the U/S front end 40. The temporal shift upon reception $\delta t_{RX}$ may be obtained using a controllable sequencer 22, selecting the appropriate series of values in a digitalized signal outputted by the amplifier and ADC 42, using a shift register or another kind of digital buffer, for instance. And a correction module 21 may determine the variable delay $d/v_{us}$ from the digitalized signal outputted by the signal conditioning module 32 (digitalized signal which is representative of the signal outputted by the displacement sensor 11). In the embodiment of FIGS. 4 to 6, the displacement d of the transducer 6 is its displacement relative to the probe's casing 3.

Figure 8:
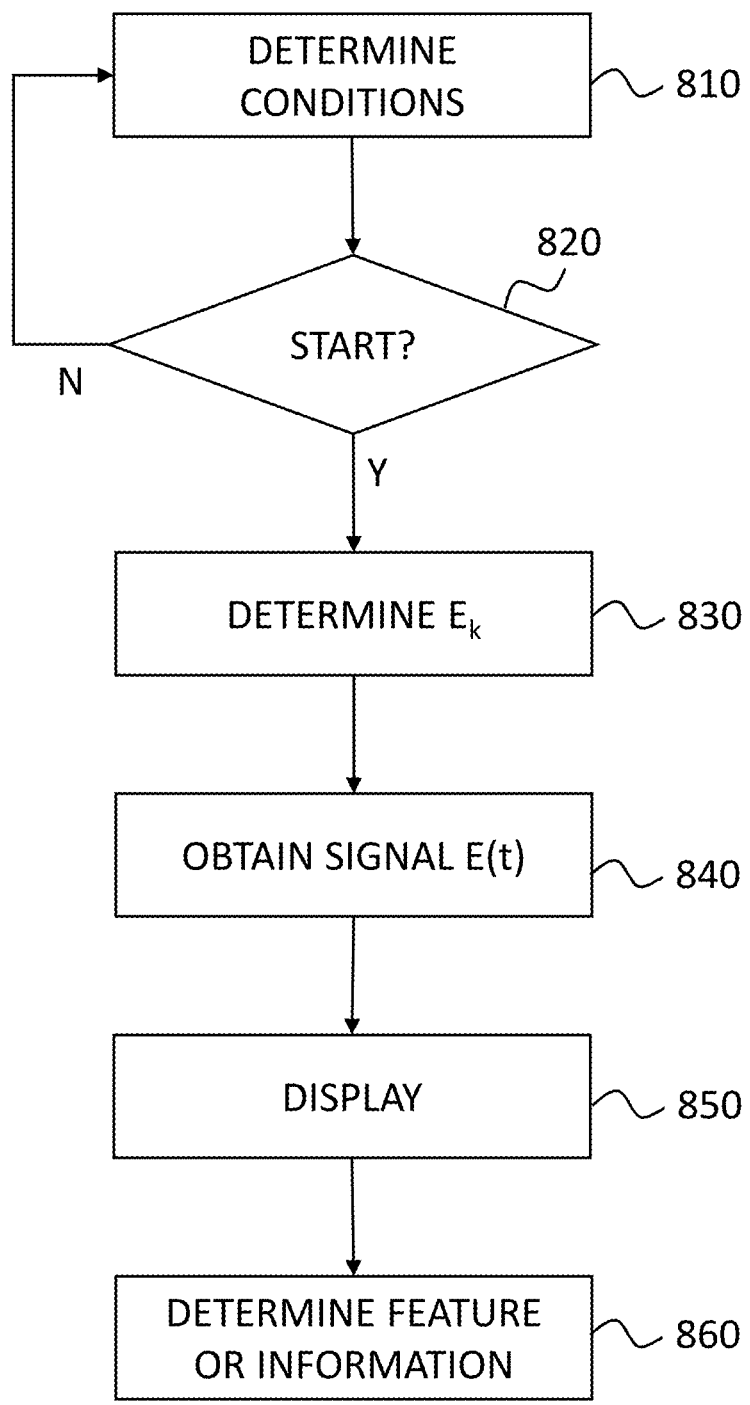
FIG. 8 is a flow-chart describing an embodiment of the invention.

FIG. 8 is a flow-chart describing an embodiment of the invention. According to this embodiment, the obtained signal E(t) representative of the variations of the value of the mechanical property of the region 80 over time is used for determining a feature relative to the mechanical property. In the following, the mechanical property corresponds to the tissue stiffness, and more specifically a liver stiffness. It will be appreciated that any other mechanical property may be measured, such as elasticity, Young's modulus, shear modulus, shear wave speed, viscoelasticity, viscosity or any composite biomarker deriving from (or combining) one or more of the previous physical quantities. Also, it will be appreciated that other parts of the body may be considered, for example the brain.

In an optional step 810, one or more conditions for triggering the determination of the measurements $E_k$ (with k an integer greater than 1) of the tissue stiffness (or simply "stiffness") may be determined. As mentioned above, the one or more conditions may include, for example:

- a condition relative to whether the position and direction of the probe 2 is adequate, i.e. whether the probe 2 is correctly positioned with respect to the region 80 of the body 8 for which measurements of the mechanical property are to be obtained. The not-yet published US patent application U.S. Ser. No. 17/695,053 assigned to the applicant details examples of determination of such condition; and/or
- a condition relative to whether the tip 4 is properly applied against the body 8 of the subject. Such condition may be determined, for example, based on contact force level measured by a force sensor (like a strain gauge) or deduced from the position of the shaft 4' pushed into the casing when the tip is pressed on the subject's body; and/or
- a condition relative to whether the subject is holding his breath.

As an example, this indicator can be obtained from the correlation of successive ultrasound echo signals. Successive ultrasound signals may be emitted through the region of the body explored, and respective echo signals may be received. A coefficient of correlation between successive echo signals may then be computed. A high coefficient of correlation (close to 1) indicates that the tissue located in front of the probe are stable. For example, the indicator may indicate that the subject is holding his breath when the coefficient of correlation is below a predefined threshold, for instance 0.9 or 0.95 or 0.99. The pulse repetition period between the collected ultrasound signals can be typically 50 ms, more generally between 5 ms and 200 ms, typically 100 ms.

In an optional step 820, the electronic unit 10 may determine whether all conditions determined at step 810 are met. When at least one condition is not met (step 820, arrow "Y"), the acquisition of the measurements $E_k$ does not begin. When all conditions are met (step 820, arrow "N"), the acquisition of the measurements $E_k$ can begin (step 830). As mentioned above, the acquisition of the measurements $E_k$ may be performed semi-automatically (for example, the operator is informed that all conditions are met—e.g. using information displayed on the screen or a visual indication on the probe—and push a button to trigger the acquisition of the first measurements, all the subsequent measurements being automatically acquired), or fully automated (for example, as soon as the electronic unit determines that all conditions are met, the series of mechanical pulses are emitted and the corresponding measurements $E_k$ are determined).

The measurements $E_k$ may be determined (step 830) as described above, with an elastography device as represented in FIG. 4. However, the invention is not limited to this case, and any elastography device may be used for determining the measurements $E_k$.

Whatever the elastography technique used, the measurements are carried out at a sufficiently high repetition rate to observe, in the resulting elasticity signal E(t), the variations of the stiffness measurement during a cardiac cycle. For the same reasons, the measurements are taken over a duration covering at least one cardiac cycle (whose duration is, in general, of the order of a second).

In practice, a repetition rate of at least 4 measurements per second makes it possible to obtain a resulting signal that is sufficiently precise to translate the variations in stiffness as a function of time over a period of time corresponding to a cardiac cycle. It will be appreciated that this repetition rate can be higher, for example 5, 6, 7, 8, 9, 10 or more than 10 measurements per second.

The duration during which the measurements are determined is at least equal to 1 second (order of magnitude of the average duration of a cardiac cycle), but may be greater than 1 second. For example, a duration of 3 seconds allows, for the majority of the subjects, to observe the variations of the value of stiffness during at least two cardiac cycles (a cardiac cycle can generally last from 0.7 to 1.5 seconds, depending on the subject). It will be appreciated that larger values of the duration during which the measurements are carried out can be used, for example between 5 and 10 seconds or greater than 10 seconds. When the subject is asked to hold his breath, this duration cannot be too long.

As mentioned above, each measurement $E_k$ is associated with a respective time $t_k$, which may be for example the time at which the measurement is performed, or, when the measurement is obtained from an emission of a mechanical pulse, the respective time associated with the measurement may be a time at which the corresponding mechanical pulse is delivered. Other embodiments are possible.

A signal E(t) is then obtained (step 840) from the measurements $E_k$ determined at step 830. The signal E(t) may comprise all the measurements acquired or several measurements among all the measurements acquired. For example, an interpolation (for example a linear interpolation or a spline interpolation) may be used to obtain a continuous signal over time, and "complete" the values of the stiffness between two instants $t_k$, $t_{k+1}$ associated with two consecutive measurements $E_k$, $E_{k+1}$.

In an optional step 850, a curve representative of at least a portion of the signal may be displayed on a screen. Such display may provide important diagnostic information to the medical practitioner in charge of the subject.

In addition, in an embodiment, an electrocardiogram ECG of the subject can be obtained in parallel of the obtention of the LSM signal E(t) and such ECG may be displayed on the same screen. The medical practitioner may therefore use information comprised in the ECG to analyze the curve of the LSM signal E(t).

In an optional step 860, at least one feature representative of the stiffness may be extracted from the obtained signal E(t). In various embodiments, such feature may be a single value determined from the obtained signal E(t). For example, the feature may be a function of the minimum, the maximum, a given percentile, the mean, the standard variation or any statistical characteristic of the signal over a given period of time. The feature may also be a function of a combination of at least two statistical characteristics of the signal. The given period of time may be the entire duration of the signal, or only a part of it (for example, a period of time during which the subject is holding his breath). Taking into account the signal E(t) provides a more accurate feature representative of the stiffness than current elastography techniques.

Indeed, in current elastography techniques, several (e.g. 10) measurements of the stiffness are determined at respective instants that can correspond to very different values of the stiffness. From these measurements, a feature representative of stiffness is computed (e.g. the mean or the median of the measurements), without taken into account such variability. Therefore, this feature is not as accurate as if it had been determined from the complete signal. An illustration of this is provided in FIG. 9.

Figure 9:
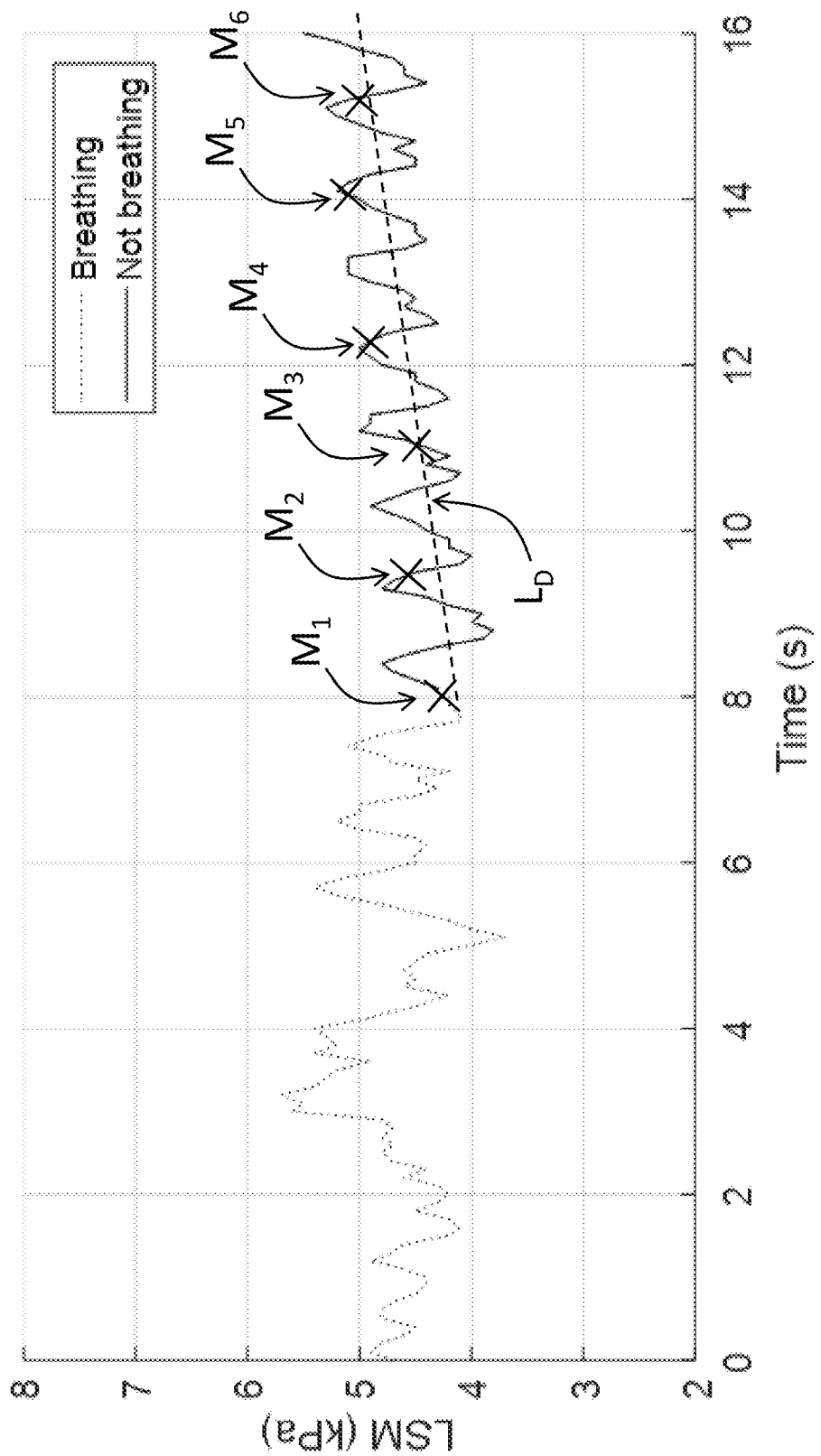
FIG. 9 represents an example of a curve of the LSM (liver stiffness measurement) signal according to one or more embodiments of the invention.

FIG. 9 represents an example of a curve of the signal E(t) of the liver stiffness measurement of a subject over time. This curve comprises two portions: one in dashed line during which the subject is not holding his breath (between 0 and 8 seconds), and one in solid lines during which the subject is holding his breath (between 8 and 16 seconds). In the following, it is assumed that the feature representative of the stiffness is extracted (step 860 of FIG. 8) from the portion of the signal E(t) during which the subject is holding his breath.

In the example of FIG. 9, it is assumed that several liver stiffness measurements $M_1$, $M_2$, $M_3$, $M_4$, $M_5$, $M_6$ are taken at respective instants and used to determine a single "final" measurement M, as is conventionally done in current techniques for determining the value of the liver stiffness (the wording "$M_i$", "M" is used here to distinguish the techniques of the prior art with the technique proposed in the present invention). The example of FIG. 9 is based on 6 liver stiffness measurements, but another number of measurements may be used (in general, 10). The final measurement is M, for example, the mean or the median of the measurements $M_1$, $M_2$, $M_3$, $M_4$, $M_5$, $M_6$.

However, in the example of FIG. 9, as will be appreciated by the skilled person, these measurements $M_1$, $M_2$, $M_3$, $M_4$, $M_5$, $M_6$ mostly correspond to high values of the liver stiffness signal. Therefore, as will be appreciated by the skilled person, the final measurement M obtained by standard techniques (computed as the mean or the median of the measurements $M_1$, $M_2$, $M_3$, $M_4$, $M_5$, $M_6$) is overvalued compared to the mean or the median value E of the signal E(t).

It can be understood from this example that, depending on the times at which the measurements $M_i$ are taken, the final measurement M may have very different values and can be, for instance overvalued or undervalues, which can have important consequences in terms of diagnosis and patient care.

On the contrary, as will be appreciated by the skilled person, a feature E relative to the liver stiffness determined based on the signal (or a portion of the signal) E(t) is far more accurate because it avoids scenarios like the one mentioned above. For example, the feature E may be computed as the mean of the signal, the median of the signal, the half-sum of the maximum and the minimum of the signal, etc.

Furthermore, information relating to the dispersion of the data, which could have high diagnostic values, could also be calculated, for example the coefficient of variation or the interquartile range.

The feature E representative of the liver stiffness of the subject may also be determined based on spectral characteristic(s) of the obtained signal E(t) (or a part of it), obtained by performing a spectral analysis of the obtained signal E(t) (or a part of it). For example, the spectral analysis may be performed on the part of the signal corresponding to a time interval during which the subject is holding his breath.

Indeed, as can be seen in the curve representative of the signal E(t) of the liver stiffness measurement over time represented in FIG. 3 or FIG. 9, when the subject is holding his breath, the corresponding portion of the curve presents periodic or pseudo-periodic variations, which, is believed, correspond to variations of the Central Venous Pressure as detailed above. By "pseudo-periodic", it is meant that the signal is not strictly periodic, but its curve comprises a succession of similar patterns which repeat themselves for substantially equal time intervals. When the subject is not holding his breath, the signal E(t) is too noisy to observe such periodic or pseudo-periodic variations.

For such periodic or pseudo-periodic signals, a spectral analysis makes it possible to obtain spectral characteristics such as the center frequencies of the peaks in the frequency domain, the bandwidths of the peaks at −3 dB (or other thresholds such as −6 dB), the relative heights of the peaks, etc. These spectral characteristics may also be used for determining one or more feature relative to the liver stiffness of the subject, but also one or more feature relative to the Central Venous Pressure of the subject (which are classically obtained by invasive techniques such as catheterization).

For example, a Fourier Transform may be applied to the portion of the signal corresponding to a time interval during which the subject is holding his breath (which may be determined, as mentioned above, by using a breath holding indicator for example). The breath holding indicator may be determined by computing a correlation coefficient between successive ultrasound signals and comparing the computed correlation coefficient to a predefined threshold.

The signal spectrum obtained may comprise a diffuse peak around the period associated with the periodic or pseudo-periodic variation (the period corresponding to the duration of the cardiac cycle of the subject). A band-stop filter (with a stopband defined based on the width of the peak) can then be applied to eliminate the periodic or pseudo-periodic variation of the signal, and a processed signal E'(t) corresponding to the signal E(t) deprived from this periodic or pseudo-periodic variation can be obtained by an inverse Fourier Transform. The feature relative to the liver stiffness of the subject may then be obtained from this processed signal E'(t), by example by taking the mean or the median or any function of statistical characteristics of the processed signal E'(t).

As mentioned above, in some embodiments, at step 860, a feature or information relative to the Central Venous Pressure (CVP) of the subject may be determined (instead or in addition to the feature relating to the stiffness of the subject). For example, the periodic or pseudo-periodic variation observed in the signal E(t) when the subject is holding his breath is linked to the value of the CVP, and extracting this periodic or pseudo-periodic variation, or a part of it, may provide information relative to the variation of the CVP over time. By studying variations of the periodic or pseudo-periodic component of the signal E(t), the medical practitioner may be able to detect an anomaly in the curve of the CVP which may suggest a cardiac pathology of the subject.

Another feature that may be extract at step 860 relates to the drift (or "trend") of the curve of the signal E(t) of the LSM over time when the subject is holding his breath. Such drift is represented in FIG. 9 by a dashed line noted LD. In fact, the inventors observed that a more or less significant drift is observable in the curve of the LSM signal E(t) when the subject is holding his breath (more specifically, this drift may be observable only when the part of the curve during which the subject is holding his breath because the signal E(t) is too noisy when the subject is breathing). A possible explanation for the presence of such drift is that the LSM (or other mechanical property) signal is very sensitive to hemodynamics of the heart. As will be appreciated by the skilled person, the analysis of the trend of the signal can be of high diagnostic interest for patients with cardiovascular disorders. For example, the trend could be analyzed while the patient is holding his breath to determine or assess how blood pressures change in the abdominal cage.

The feature relating to the drift may be for example the slope of the line LD. It will be appreciated that the drift may not be necessary linear (and therefore representable by a line), but could be exponential or logarithmic.

The at least one feature or one piece of information relative to the stiffness and/or the CVP of the subject determined at step 860 can optionally be displayed on a screen, to be used by the medical practitioner.

As mentioned above, it is noted that, even the elastography device represented in FIGS. 4 to 6 is a Vibration-Controlled Transient Elastography (VCTE) device, aspects of the present invention can be generalized to any type of elastography device making it possible to obtain measurements with a sufficiently high repetition rate (e.g. at least 4 per second). In particular, the present invention may be applied to other TE (Transient Elastography) devices, for example devices implementing ARFI (Acoustic Radiation Force Impulse) or SWE (Shear Wave Elastography) technologies. In ARFI and SWE, unlike in the VCTE technology, a longitudinally moving shear wave is not generated by an external vibrator. Instead, in ARFI, pressure radiation generated by ultrasounds is focused in a region of interest. The radiation pressure generates a laterally moving shear wave that is tracked outside the region of interest using ultrasound tracking pulses.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. An elastography device to obtain a signal representative of variations of a mechanical property of a region of a body of a subject with time, the region of the body being liver, spleen or brain, the elastography device comprising:
a probe including a vibrator configured to generate a transient low-frequency mechanical pulse at a central frequency between 10 and 500 Hz in the body of the subject and at least one transducer configured to emit ultrasounds, the probe being further configured to acquire ultrasound echo signals to track a propagation of the transient low-frequency mechanical pulse in the body of the subject;
an electronic unit in communication with the least one ultrasound transducer for controlling emission of the ultrasounds, the electronic unit comprising electronic circuitry adapted to
process the ultrasound echo signals received by the probe and determine, in real time, at a repetition rate of at least 4 measurements per second and for a duration of at least 1 second, measurements of the mechanical property associated with liver, spleen or brain using the ultrasound echo signals received by the probe, each measurement of the mechanical property being associated with a respective time,
generate, with said measurements, and in real time, the signal representative of the variations of the mechanical property of the region of the body, wherein the signal representative of the variations of the mechanical property with time comprises a plurality of the measurements of the mechanical property determined, and
output a value representative of the mechanical property based on the generated signal.

2. The elastography device of claim 1, wherein, for determining each of the measurements of the mechanical property, the electronic unit is adapted to:
deliver to the body of the subject, via the probe, the transient, low frequency mechanical pulse having the central frequency between 10 and 500 Hz;
upon delivery of said mechanical pulse, control the ultrasound transducer to emit a sequence of ultrasound pulses, and acquire the ultrasound echo signals received in response by the ultrasound transducer to track how a low frequency elastic wave induced by the mechanical pulse propagates through the region of the body of the subject, and determine the respective measurement of the mechanical property related to low frequency elastic wave propagation.

3. The elastography device of claim 1, wherein the electronic unit is adapted to control the vibrator to deliver to the body of the subject said transient, low frequency mechanical pulse.

4. The elastography device of claim 3, wherein the electronic unit is further configured to generate, for one or more of the ultrasound pulses emitted:
a temporal offset upon emission, by which the emission of an ultrasound pulse is shifted; and/or
a temporal offset upon reception, by which one of the ultrasound echo signals, acquired in response to said emitted ultrasound pulse, is shifted;
so as to compensate for a temporal shift of said one of the ultrasound echo signals with respect to other ones of the ultrasound echo signals acquired, caused by a displacement of the ultrasound transducer occurring during said sequence of ultrasound pulses,
the temporal offset upon emission and/or the temporal offset upon reception being adjusted so that a difference thereof is equal to $2d/v_{us}+C$, where d is a displacement of the probe with respect to a reference position, $v_{us}$ is a speed of ultrasound in the region of the body, and C is a constant.

5. The elastography device of claim 1, wherein the respective time associated with each measurement of the mechanical property corresponds to a time at which the measurement is determined.

6. The elastography device of claim 1, wherein the duration of the determination of the measurements is at least 3 seconds.

7. The elastography device of claim 1, wherein the region of the body is a part of the liver of the subject.

8. The elastography device of claim 1, wherein the electronic unit is further adapted to determine, from the obtained signal, at least one feature relating to the mechanical property.

9. The elastography device of claim 8, wherein said at least one feature is a function of a maximum, a minimum, a mean, a standard deviation and/or a percentile of the obtained signal.

10. The elastography device of claim 1, wherein the electronic unit is further adapted to determine a breath holding indicator indicating whether the subject is holding his breath or not.

11. The elastography device of claim 10, wherein the breath holding indicator is determined by emitting successive ultrasound signals, receiving respective ultrasound echo signals in response to the emission of said ultrasound signals, and computing a correlation coefficient between successive ultrasound echo signals among the received ultrasound echo signals received, and comparing the computed correlation coefficient to a predefined threshold.

12. The elastography device of claim 10, wherein the electronic unit is adapted to control the vibrator to trigger the delivery of the plurality of mechanical pulses when the breath holding indicator indicates that subject is holding his breath.

13. The elastography device of claim 1, wherein a portion of the obtained signal comprises measurements determined while the subject is holding his breath.

14. The elastography device of claim 13, wherein the electronic unit is further adapted to perform a spectral analysis of said portion of the obtained signal so as to obtain at least one spectral characteristic said portion, and
wherein the electronic unit is further adapted to determine at least one feature relating to the mechanical property, said at least one feature being a function of the at least one spectral characteristic obtained.

15. The elastography device of claim 13, wherein said portion of the obtained signal corresponds to a first time interval, wherein the electronic unit is further adapted to
receive an electrocardiogram of the subject, wherein a portion of the electrocardiogram corresponds to a second time interval, said first time interval and second time interval overlapping in time, and
control a display device to display both a curve representative of the portion of the obtained signal and a curve representative of the portion of the electrocardiogram.

16. The elastography device of claim 13, wherein the electronic unit is further adapted to determine, from said portion of the obtained signal, information relating to a variation of a central venous pressure of the subject with time.

17. The elastography device of claim 16, wherein said information comprises at least one indicator relative to a drift of the central venous pressure of the subject over time.

18. The elastography device of claim 16, wherein the electronic unit is further adapted to emit, based on the determined information, an alert relative to a possible cardiovascular pathology of the subject.

19. The elastography device of claim 1, wherein the electronic unit is adapted to control the probe and the ultrasound transducer such that each sequence of ultrasounds is interleaved between two consecutive low frequency mechanical pulses to determine the measurements of the mechanical property.

20. An elastography method, implemented by an elastography device to obtain a signal representative of variations of a mechanical property of a region of a body of a subject with time, the region of the body being liver, spleen or brain, the elastography including a probe that includes a vibrator configured to generate a transient low-frequency mechanical pulse at a central frequency between 10 and 500 Hz in the body of the subject and at least one transducer configured to emit ultrasounds, the probe being further configured to acquire ultrasound echo signals to track a propagation of the transient low-frequency mechanical pulse in the body of the subject, and an electronic unit in communication with the least one ultrasound transducer for controlling emission of the ultrasounds, the method comprising:
emitting by the at least one ultrasound transducer ultrasounds towards said region of the body,
processing, by the electronic circuit, the ultrasound echo signals received by the probe and determining, by the electronic circuit, in real time, at a repetition rate of at least 4 measurements per second and for a duration of at least 1 second, measurements of the mechanical property associated with liver, spleen or brain using the ultrasound echo signals received by the probe, each measurement of the mechanical property being associated with a respective time,
generating, by the electronic circuit and with said measurements, and in real time, the signal representative of the variations of the mechanical property of the region of the body, wherein the signal representative of the variations of the mechanical property with time comprises a plurality of the measurements of the mechanical property determined, and
outputting a value representative of the mechanical property based on the generated signal.

* * * * *